United States Patent
Yamaguchi et al.

(10) Patent No.: US 9,638,114 B2
(45) Date of Patent: May 2, 2017

(54) BOAT ENGINE IDLING REVOLUTION NUMBER CONTROL DEVICE AND METHOD

(71) Applicant: Mitsubishi Electric Corporation, Chiyoda-ku, Tokyo (JP)

(72) Inventors: Yohei Yamaguchi, Hyogo (JP); Yasuhiko Ishida, Hyogo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 313 days.

(21) Appl. No.: 14/595,768

(22) Filed: Jan. 13, 2015

(65) Prior Publication Data

US 2016/0003172 A1    Jan. 7, 2016

(30) Foreign Application Priority Data

Jul. 3, 2014    (JP) .................. 2014-137460

(51) Int. Cl.
*F02D 31/00* (2006.01)
*F02D 29/02* (2006.01)
(Continued)

(52) U.S. Cl.
CPC ........... *F02D 29/02* (2013.01); *F02D 31/005* (2013.01); *F02D 41/0002* (2013.01);
(Continued)

(58) Field of Classification Search
CPC ........ F02D 31/001; F02D 29/02; F02D 31/00; F02D 31/005; F02D 41/0002;
(Continued)

(56) References Cited

U.S. PATENT DOCUMENTS 5,365,903 A * 11/1994 Watanabe ............. F02D 31/005
                                                      123/339.22
5,375,574 A * 12/1994 Tomisawa ............. F02D 31/005
                                                      123/339.22

(Continued)

FOREIGN PATENT DOCUMENTS

JP            5289854 B2    9/2013

*Primary Examiner* — Hung Q Nguyen
*Assistant Examiner* — John Bailey
(74) *Attorney, Agent, or Firm* — Sughrue Mion, PLLC; Richard C. Turner

(57) ABSTRACT

Provided is a boat engine idling revolution number control device, which includes a control unit (30) for performing control so that an engine revolution number converges to a target revolution number based on a result of detection of an engine state. The control unit includes: a decelerating running determining section (314); and a running-load correction calculating function section (315) for calculating a running-load correction signal for correcting a basic torque rate based on the result of determination by the decelerating running determining section and a shift position state detected by the neutral switch. The running-load correction calculating function section resets the running-load correction signal to zero when detecting, based on a behavior of the engine revolution number after the running-load correction, that the engine revolution number is larger than a threshold value calculated based on the target revolution number and the engine revolution number increases.

7 Claims, 14 Drawing Sheets

(51) Int. Cl.
- *F02D 41/02* (2006.01)
- *F02D 41/16* (2006.01)
- *F02D 41/24* (2006.01)
- *F02D 41/00* (2006.01)
- *F02P 5/15* (2006.01)
- *F02D 41/14* (2006.01)

(52) U.S. Cl.
CPC ......... *F02D 41/0225* (2013.01); *F02D 41/16* (2013.01); *F02D 41/2422* (2013.01); *F02D 41/2451* (2013.01); *F02D 41/2448* (2013.01); *F02D 2041/1432* (2013.01); *F02D 2200/021* (2013.01); *F02D 2200/0411* (2013.01); *F02D 2200/501* (2013.01); *F02D 2200/502* (2013.01); *F02D 2250/18* (2013.01); *F02P 5/1508* (2013.01); *Y02T 10/42* (2013.01)

(58) Field of Classification Search
CPC .. F02D 41/0225; F02D 41/16; F02D 41/2422; F02D 41/2451; F02D 41/2448; F02D 2041/1432; F02D 2200/021; F02D 2200/0411; F02D 2200/501; F02D 2200/502; F02D 2250/18; F02P 5/15

USPC ......... 123/339.11, 406.61, 319, 339.14, 351, 123/352, 356, 687, 376, 339.12, 339.18, 123/339.21, 339.23, 360, 149 F, 345, 361, 123/389, 391, 402, 403, 681, 683, 339.19, 123/680, 674, 686, 493; 701/110, 103, 701/102; 477/110, 111, 112, 113; 73/114.15; 180/170; 290/17; 261/121.4
See application file for complete search history.

(56) References Cited

U.S. PATENT DOCUMENTS

| | | | | |
|---|---|---|---|---|
| 5,392,215 | A * | 2/1995 | Morita | B60K 31/047 123/352 |
| 5,564,387 | A * | 10/1996 | Igarashi | F02D 41/083 123/339.23 |
| 6,079,389 | A * | 6/2000 | Ono | F02D 31/005 123/352 |
| 7,680,582 | B2 * | 3/2010 | Ishida | F02D 31/003 123/339.22 |
| 8,092,264 | B2 * | 1/2012 | Kinoshita | B63H 21/213 440/1 |
| 8,930,050 | B2 * | 1/2015 | Garon | F02D 11/106 440/87 |
| 9,126,583 | B2 * | 9/2015 | Tsuchikawa | B60K 6/48 |
| 2004/0090195 | A1 * | 5/2004 | Motsenbocker | B63B 43/18 318/109 |
| 2005/0092225 | A1 * | 5/2005 | Kaji | B63H 25/42 114/144 R |
| 2005/0240333 | A1 * | 10/2005 | Bauerle | F02D 41/021 701/93 |
| 2006/0160440 | A1 * | 7/2006 | Ishida | B63H 21/21 440/87 |
| 2006/0166573 | A1 * | 7/2006 | Vetta | B63H 20/12 440/75 |
| 2007/0017426 | A1 * | 1/2007 | Kaji | B63J 99/00 114/144 RE |
| 2008/0188346 | A1 * | 8/2008 | Sugai | B60K 6/445 477/15 |
| 2008/0280511 | A1 * | 11/2008 | Kado | B63H 21/213 440/1 |
| 2009/0287394 | A1 * | 11/2009 | Ishida | F02D 31/003 701/103 |
| 2010/0121539 | A1 * | 5/2010 | Price | F02D 41/0205 701/50 |
| 2010/0191430 | A1 * | 7/2010 | Kobayashi | F16H 61/061 701/60 |
| 2010/0280685 | A1 * | 11/2010 | Garon | F02D 41/2464 701/21 |
| 2012/0291754 | A1 * | 11/2012 | Yamaguchi | F02D 41/2464 123/458 |

* cited by examiner

BOAT ENGINE IDLING REVOLUTION NUMBER CONTROL DEVICE AND METHOD

BACKGROUND OF THE INVENTION

1. Field of the Invention

The present invention relates to a boat engine idling revolution number control device and method for appropriately controlling an engine idling revolution number of an internal combustion engine to be mounted on a boat.

2. Description of the Related Art

In the field of electronically-controlled internal combustion engines, the following technology of controlling an engine idling revolution number is conventionally well known. Specifically, when a predetermined idling condition is satisfied, an air amount to be supplied to the internal combustion engine (hereinafter also referred to as "engine") is controlled so as to control an engine revolution number to a predetermined value. According to this kind of technology, the air amount is controlled by an air intake regulator valve in accordance with a difference between a target revolution number and an actual revolution number during the idling operation so that the difference is eliminated by feedback control.

Moreover, in accordance with a state in which the boat is running while decelerating or in accordance with a shift position state of a gear mechanism included in the engine, the engine revolution number is required to be controlled so as to be kept properly. In view of the requirements described above, an engine idling revolution number control device which can deal with specific uses of outboard motors has been proposed (see, for example, Japanese Patent No. 5289854).

The related art has, however, the following problems.

The related-art engine idling revolution number control device described above supplies the air amount in accordance with an engine load and performs the feedback control so as to eliminate the difference between the target revolution number and the actual revolution number during the idling operation of the engine so that the engine steadily operates at the target revolution number.

In the case of boats, however, the load on the engine greatly varies depending on the shift position state, the target revolution number during the idling, a boat speed during the idling, or the like. In particular, in the case where a decelerating operation is performed by closing a throttle valve to bring the engine into an idling state while the boat is running (moving forward with the shift position "forward") at a high boat speed (for example, at 50 km/h or higher), the boat speed does not drop immediately. During the decelerating operation, a propeller is driven by a water stream. Therefore, the engine is driven by the propeller.

In the case described above, even when the engine is in the idling state, the engine revolution number becomes significantly higher than the target revolution number during the idling. If revolution number feedback is implemented in this state, the air amount to be supplied to the engine is excessively reduced by revolution number feedback correction in order to decrease the engine revolution number. If the shift position is put into neutral in this state, an engine driving force by the propeller cannot be obtained anymore. Moreover, the air amount for maintaining the idling state is insufficient. Thus, an engine stall occurs in some cases.

As described above, in order to avoid the engine stall due to feedback divergence caused by a disturbance such as the drive by the propeller, a revolution number feedback gain cannot be set higher. Therefore, it is conventionally difficult to achieve both stability of the engine idling revolution number control device and responsiveness during a transition such as during deceleration.

Moreover, the size and shape of the propeller to be mounted differ for each boat in many cases depending on purposes of use specific to the boats. Therefore, a running load (torque) when the boat moves forward or backward during idling varies depending on the type of propeller. Therefore, a difference is sometimes generated between an engine output torque determined based on a set value and a torque necessary to maintain the target revolution number. In this case, a deviation is generated in revolution number and therefore is absorbed by the revolution number feedback.

Moreover, when the throttle valve is brought into the idling state again and the shift position is put into neutral while the boat is running forward, the engine is not driven by the propeller. Therefore, the engine revolution number can be smoothly converged to the target revolution number. However, when the shift position is put into reverse while the speed of forward movement of the boat is high, the propeller is rotated in a forward direction (to move forward) by the water stream. Therefore, the engine rotates the propeller in an opposite direction (to move backward), and hence a propeller load on the engine is large. Thus, when the boat speed is high, the propeller load does not balance the output torque of the engine. Thus, there is a problem in that an engine stall is likely to occur.

Moreover, the following system has been proposed as the related art and has been put into practical use. Specifically, the system uses a shift-position detection sensor for detecting the shift position of a gear mechanism of the engine (neutral, forward, or reverse) to correct the air amount in accordance with the shift position so as to avoid the engine stall by the shifting operation for the deceleration. In the case of a small outboard motor, however, the shift position detection sensor is difficult to use in view of costs or mountability. Thus, a neutral switch (SW) capable of detecting only the shift position "forward or reverse" or "neutral" is commonly used.

SUMMARY OF THE INVENTION

The present invention has been made to solve the problems described above and therefore has an object to provide a boat engine idling revolution number control device and a boat engine idling revolution number control method, which are capable of preventing engine revolution number drop-off or an engine stall that may occur when a decelerating operation transitions to an idling operation or when a throttle lever is put into a reverse position while a boat is moving at a certain speed and capable of absorbing a change in torque necessary to maintain an engine revolution number during idling or a change in propeller load to quickly stabilize the engine revolution number to a target revolution number with a low-cost system configuration even for a small boat.

According to one embodiment of the present invention, there is provided a boat engine idling revolution number control device, including: an engine revolution number detecting section for detecting a revolution number of an engine to be mounted in a boat; an engine temperature detecting section for detecting a warmed-up state of the engine; an idling operation state detecting section for detecting an idling operation state of the engine; a neutral switch for detecting whether a shift position state of the engine is neutral, or forward or reverse; and a control unit for performing control so as to converge the engine revolution number to a target revolution number when an engine state of the engine is an idling state, the engine state being defined by results of the detections by the engine revolution number detecting section, the engine temperature detecting section, the idling operation state detecting section, and the neutral switch. The control unit includes: a simulated boat-speed calculating function section for calculating a simulated boat speed based on the engine revolution number and the shift position state; a decelerating running determining section for calculating one of a deviation and a ratio of the simulated boat speed with respect to a target boat speed corresponding to a target revolution number during idling to determine whether the engine is being rotated by a propeller or is rotating by itself depending on a running state of the boat based on a result of the calculation; a basic torque-rate calculating function section for calculating a basic torque rate, which is a rate of a torque to be generated to a maximum torque of the engine and is necessary for the engine to steadily operate at the target revolution number while the engine is in the idling state, based on the shift position state detected by the neutral switch, the warmed-up state of the engine detected by the engine temperature detecting section, and the target revolution number; a revolution number feedback correction calculating function section for outputting a revolution number feedback correction signal for correcting the basic torque rate so as to eliminate a deviation between the target revolution number and the engine revolution number; a torque-rate learning correction calculating function section for calculating a torque-rate learning correction signal based on the revolution number feedback correction signal; a running-load correction calculating function section for calculating a running-load correction signal for correcting the basic torque rate in accordance with a result of the determination by the decelerating running determining section and the shift position state detected by the neutral switch; a target torque-rate calculating function section for calculating a target torque rate based on the basic torque rate, the revolution number feedback correction signal, the torque-rate learning correction signal, and the running-load correction signal; a target air-amount calculating function section for calculating a target air amount necessary to generate the target torque rate; and an intake air-amount adjusting function section for adjusting an intake air amount to be supplied to the engine based on the target air amount. The running-load correction calculating function section resets the running-load correction signal to zero when detecting, based on a behavior of the engine revolution number after a running-load correction is performed, that the engine revolution number is larger than a threshold value calculated based on the target revolution number and the engine revolution number increases.

Further, according to one embodiment of the present invention, there is provided a boat engine idling revolution number control method to be executed by an engine idling revolution number control device, the engine idling revolution number control device including: an engine revolution number detecting section for detecting a revolution number of an engine to be mounted in a boat; an engine temperature detecting section for detecting a warmed-up state of the engine; an idling operation state detecting section for detecting an idling operation state of the engine; a neutral switch for detecting whether a shift position state of the engine is neutral, or forward or reverse; and a control unit for performing control so as to converge the engine revolution number to a target revolution number when an engine state of the engine is an idling state, the engine state being defined by results of the detections by the engine revolution number detecting section, the engine temperature detecting section, the idling operation state detecting section, and the neutral switch, the boat engine idling revolution number control method including: a simulated boat-speed calculating step of calculating, by the control unit, a simulated boat speed based on the engine revolution number and the shift position state; a decelerating running determining step of calculating, by the control unit, one of a deviation and a ratio of the simulated boat speed with respect to a target boat speed corresponding to a target revolution number during idling to determine whether the engine is being rotated by a propeller or is rotating by itself depending on a running state of the boat based on a result of the calculation; a basic torque-rate calculating step of calculating, by the control unit, a basic torque rate, which is a rate of a torque to be generated to a maximum torque of the engine and is necessary for the engine to steadily operate at the target revolution number while the engine is in the idling state, based on the shift position state detected by the neutral switch, the warmed-up state of the engine detected by the engine temperature detecting section, and the target revolution number; a revolution number feedback correction calculating step of outputting, by the control unit, a revolution number feedback correction signal for correcting the basic torque rate so as to eliminate a deviation between the target revolution number and the engine revolution number; a torque-rate learning correction calculating step of calculating, by the control unit, a torque-rate learning correction signal based on the revolution number feedback correction signal; a running-load correction calculating step of calculating, by the control unit, a running-load correction signal for correcting the basic torque rate in accordance with a result of the determination by the decelerating running determining section and the shift position state detected by the neutral switch; a target torque-rate calculating step of calculating, by the control unit, a target torque rate based on the basic torque rate, the revolution number feedback correction signal, the torque-rate learning correction signal, and the running-load correction signal; a target air-amount calculating step of calculating, by the control unit, a target air amount necessary to generate the target torque rate; and an intake air-amount adjusting step of adjusting, by the control unit, an intake air amount to be supplied to the engine based on the target air amount. The running-load correction calculating step includes a correction amount cancel processing step of resetting the running-load correction signal to zero when detecting, based on a behavior of the engine revolution number after a running-load correction is performed, that the engine revolution number is larger than a threshold value calculated based on the target revolution number and the engine revolution number increases.

According to one embodiment of the present invention, the running-load correction calculating function that enables the correction amount to be cancelled before the rotation speed is abruptly increased based on the behavior of the engine revolution number immediately after the correction. As a result, the boat engine idling revolution number control device and the boat engine idling revolution number control method can be provided, which are capable of preventing the revolution number drop-off or the engine stall that may occur when the decelerating operation transitions to the idling operation or when the throttle lever is put into the reverse position while the boat moves at a certain speed and capable of absorbing the torque change or the change in propeller load necessary to maintain the engine revolution number during idling to quickly stabilize the engine revolution number to the target revolution number with a low-cost system configuration even for a small boat.

DETAILED DESCRIPTION OF THE PREFERRED EMBODIMENT

Figure 1:
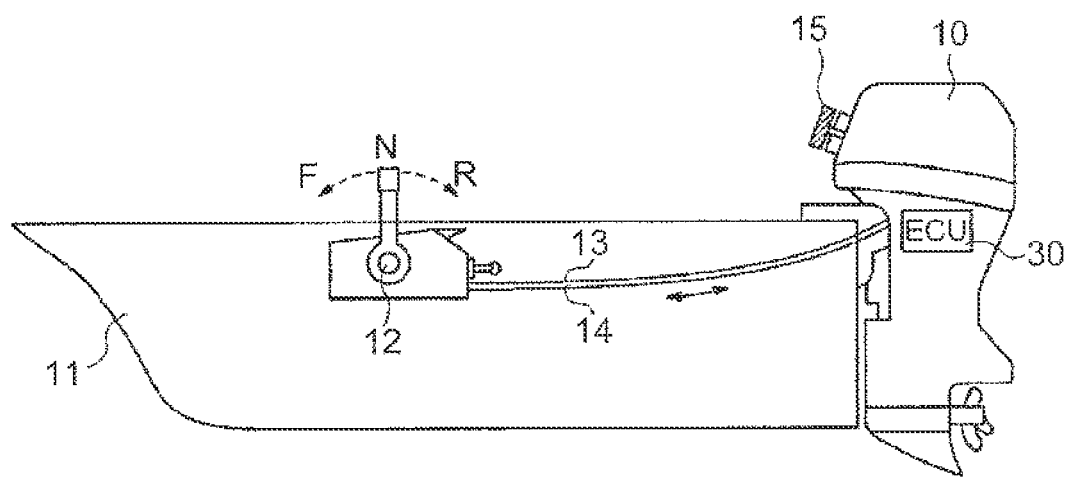
FIG. 1 is a schematic diagram illustrating an overall configuration of a boat engine idling revolution number control device according to a first embodiment of the present invention.

Now, a boat engine idling revolution number control device and a boat engine idling revolution number control method according to an exemplary embodiment of the present invention are described referring to the accompanying drawings.

First Embodiment

Prior to specific description of the present invention, contents of control to be executed by the boat engine idling revolution number control device according to the present invention are first outlined. In the present invention, conformed data is set for a rate of a torque which is desired to be generated to an engine torque necessary to maintain an engine revolution number at a target revolution number, specifically, a maximum torque which can be generated by the engine (the rate is referred to as "torque rate" in the following description) so that control is performed.

The torque rate which is necessary for the engine to be steadily operated at a predetermined revolution number when a shift position state is neutral varies depending on an engine friction. The engine friction is determined by an engine temperature and an engine revolution number for a steady operation. Therefore, map data containing the target revolution number and the engine temperature as parameters is provided so that torque-rate data in accordance with the engine load is preset in a memory included in an ECU.

Moreover, the necessary torque rate also differs depending on the shift position state. Therefore, a map of a necessary torque rate is provided for each of the shift position states, that is, neutral and "forward or reverse". As a result, the necessary torque rate is calculated by a map computation based on the shift position state, the engine temperature, and the target revolution number so as to calculate a basic torque rate.

Moreover, a feedback correction is performed on the basic torque rate based on a deviation between the target revolution number and the actual revolution number so as to absorb changes in engine characteristics and intake-system characteristics due to a variation between individual engines and change over time. The feedback correction is learned and stored under a predetermined condition so as to correct the basic torque rate constantly or periodically. In parallel to the feedback correction described above, the basic torque rate is corrected.

Moreover, when a running state changes by changing the shift position state from neutral to forward or reverse, a running-load correction is performed in accordance with a simulated boat speed so as to increase the engine torque. A running-load correction amount is calculated by a map interpolation based on a ratio of the simulated boat speed and the target revolution number or a deviation between the simulated boat speed and the target revolution number.

The target torque rate is calculated based on the calculation and the correction of the basic torque rate and the running-load correction described above, thereby calculating a torque to be generated by the engine.

Moreover, the running-load correction amount is not calculated unless the simulated boat speed is equal to or higher than a predetermined value. For example, when the shift position state is put into forward or reverse while the boat is in a stopped state, the running-load correction is not performed. Therefore, boat rushing feeling or an increase in revolution number, which is not intended by an operator, is not caused.

Moreover, when the shift position is switched to neutral or forward immediately after a full-throttle operation is performed with the shift position in reverse, whether the shift position is F (forward) or R (reverse) cannot be known only by a neutral switch. Therefore, the running-load correction is disadvantageously valid. As a result, in such a case, there is a fear in that the correction amount in the forward direction disadvantageously increases to abruptly increase the engine revolution number or give the boat rushing feeling.

Therefore, under the circumstances described above, when the revolution number is larger than a threshold value calculated from the target revolution number and a fluctuation in rotation is equal to or larger than a predetermined value as a behavior of the engine revolution number, the running-load correction value is immediately invalidated so as to prevent the engine revolution number from abruptly increasing subsequently.

Moreover, when the forward operation is switched to the reverse operation in a state where the boat is running at a certain speed, the running-load correction for preventing the occurrence of an engine stall is calculated so as to temporarily increase the correction amount. Even in this case, however, when it is determined that the engine revolution number abruptly increases, the correction amount is invalidated to stabilize the engine behavior.

Next, when ignition timing during the idling is set at a predetermined value, a basic charging efficiency is obtained from the target torque rate assuming "target torque rate=engine charging efficiency". Then, with actual ignition timing of the engine, the basic charging efficiency is corrected.

The basic charging efficiency is corrected by the preset map data based on the deviation between the actual ignition timing and the predetermined value so as to be decreased when the actual ignition timing is on an advance side and increased when the actual ignition timing is on a retard side, thereby calculating a target charging efficiency. The air amount to be supplied to the engine is calculated from the target charging efficiency, the target revolution number, an engine exhaust amount, and an air density. Then, an intake air-amount adjusting section is controlled so that the obtained air amount can be supplied.

Technical features of the present invention, which are provided by the above-mentioned method, are summarized as follows.

The basic torque rate to be generated by the engine is calculated from the target revolution number and the engine temperature.

The rotation deviation caused by a shift in engine characteristics or intake-system characteristics due to change over time is absorbed by torque-rate learning correction.

The amount of variation in load applied to the engine, which is generated by a change of the shift position, is absorbed by the running-load correction.

Moreover, a fluctuation in rotation due to other factors is absorbed by rotation feedback control.

By providing the configuration for realizing the technical features described above, the boat engine idling revolution number control device according to the present invention can quickly control the engine revolution number so that the engine revolution number becomes the target engine revolution number.

Moreover, further technical features of the present invention are summarized as follows.

The engine revolution number is subjected to primary smoothing processing to predictively calculate the boat speed. In addition, in accordance with a state of the neutral switch, a smoothing coefficient is switched. Moreover, the engine revolution number and the target revolution number during the idling are switched depending on whether or not a current state is the idling state. As a result, even without additionally providing a sensor for detecting the boat speed, the boat speed can be approximately calculated.

Moreover, based on the deviation or the ratio of the boat speed and the engine revolution number, whether or not the boat is in a decelerating state is determined. Then, when the neutral switch detects that the throttle lever is in the forward or reverse position and the boat is in the decelerating state, the rotation feedback is stopped even when the engine is in the idling state. As a result, the engine torque (air amount) can be prevented from being excessively lowered during the decelerating to prevent the occurrence of an engine stall.

Moreover, in order to maintain the engine revolution number to the target revolution number during the idling, the control is performed with the basic torque rate. Based on the deviation between the actual revolution number and the target revolution number, the torque rate is subjected to the feedback correction. Based on the feedback correction value when the deviation is eliminated, a torque-rate learning correction value (N) is calculated. Then, first, the learning is performed in a state where the shift position is neutral. Then, the basic torque rate is corrected so as to absorb a variation in engine characteristics and intake-system characteristics and the amount of change in characteristics due to change over time. Moreover, the learning value when the shift position is neutral is constantly corrected regardless of the shift position state.

Next, in a state where the learning when the shift position is neutral is completed, the above-mentioned feedback correction is performed during the idling when the neutral switch detects that the throttle lever is in the forward or reverse position. Based on the feedback correction value when the deviation is eliminated, a torque-rate learning correction value (F) is calculated. When the neutral switch detects that the throttle lever is in the forward or reverse position, the correction is constantly performed. Through provision of the configuration described above, the amount of fluctuation in rotation due to a difference in load on the propeller to be mounted to the outboard motor. In this manner, the revolution number control with higher responsiveness than that provided by the feedback alone can be performed. As a result, even the stability can be improved.

Therefore, a specific embodiment of the present invention to realize the above-mentioned technical feature is described below in detail referring to the accompanying drawings. FIG. 1 is a schematic diagram illustrating an overall configuration of a boat engine idling revolution number control device according to a first embodiment of the present invention. A propelling mechanism 10 (hereinafter referred to as "outboard motor 10"), in which an engine, a shaft, a propeller, and the like are integrated, is mounted at a stern of a boat (small boat) 11.

A throttle lever 12 is arranged in an operation seat. The throttle lever 12 is coupled to a throttle valve through a link mechanism (not shown) in the outboard motor 10 via a throttle cable 13, and adjusts an opening amount (intake air amount) of the throttle valve. The throttle lever 12 sets a shift position (forward, neutral, or reverse) through the link mechanism (not shown) and a gear mechanism (not shown) included in the outboard motor 10 via a shift cable 14.

Figure 2:
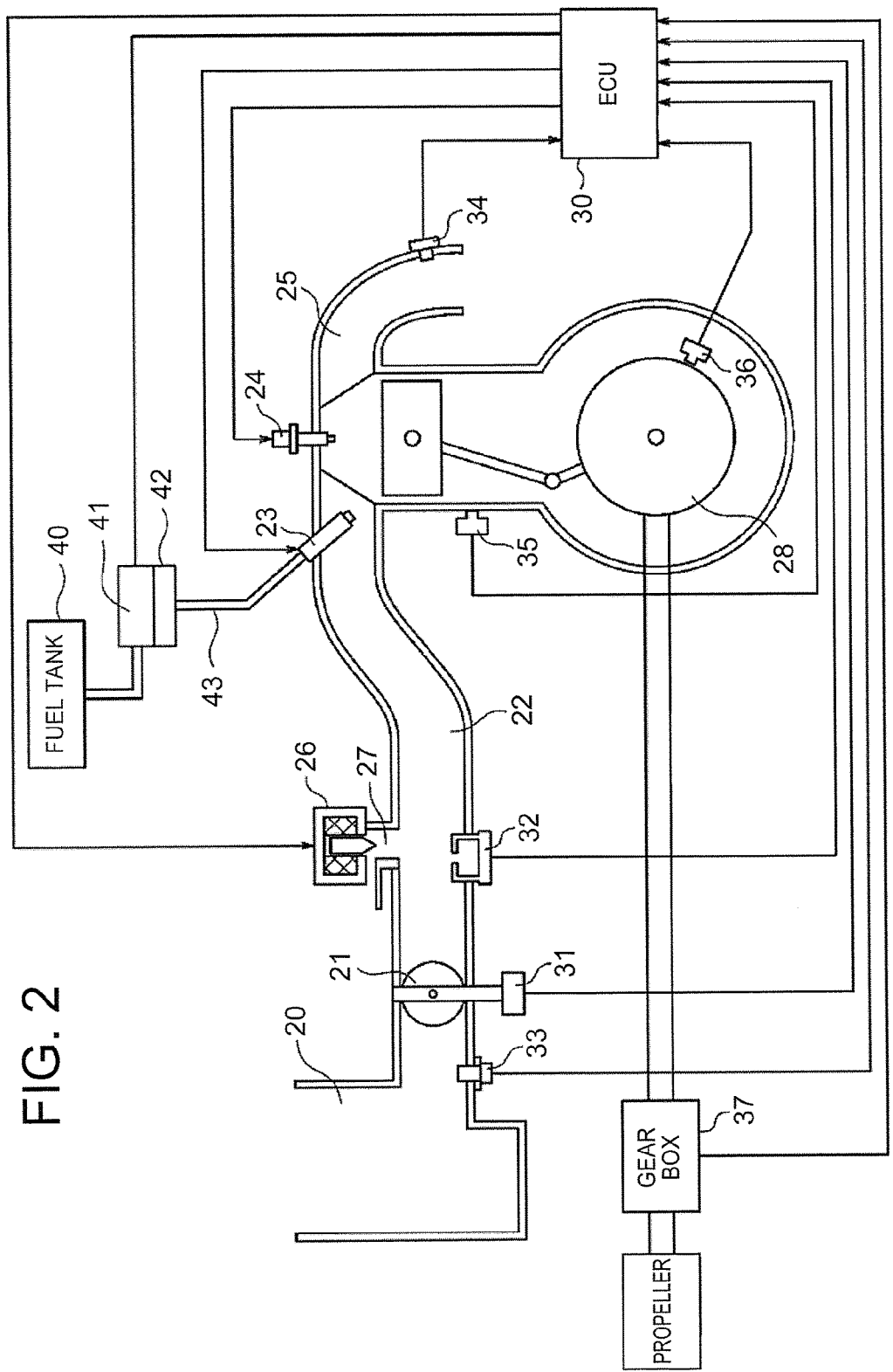
FIG. 2 is a schematic diagram illustrating an engine included in an outboard motor illustrated in FIG. 1 according to the first embodiment of the present invention.

FIG. 2 is a schematic diagram illustrating an engine included in the above-mentioned outboard motor 10 illustrated in FIG. 1 according to the first embodiment of the present invention. The air is taken into the engine illustrated in FIG. 2 via an intake pipe 20. Then, the intake air flows through an intake manifold 22 while a flow rate thereof is adjusted via a throttle valve 21. An injector 23 is arranged immediately before a combustion chamber of the intake manifold 22 and injects gas fuel.

The intake air is mixed with the injected gas fuel to form mixed air, and the mixed air flows into each of cylinder combustion chambers and is ignited by a spark plug 24 and burned. Then, exhaust gas after combustion flows through an exhaust manifold 25 and is discharged to the outside of the engine.

A throttle opening sensor 31 as an idling operation state detecting section for detecting an idling operation state of the engine is connected to the throttle valve 21. The throttle opening sensor 31 outputs a signal proportional to throttle opening (throttle opening signal) in accordance with the rotation of a throttle valve shaft. The throttle opening sensor 31 determines, in accordance with a throttle opening signal, whether or not the throttle valve 21 is fully closed, to thereby be able to detect whether or not the engine is in an idling state.

An absolute pressure sensor 32 is arranged downstream of the throttle valve 21 and outputs a signal corresponding to intake pipe absolute pressure PB (engine load). On the other hand, an intake air temperature sensor 33 is arranged upstream of the throttle valve 21 and outputs a signal proportional to intake air temperature AT.

Moreover, an overheat sensor 34 is arranged in the exhaust manifold 25 and outputs a signal proportional to engine exhaust temperature. In addition, a wall temperature sensor 35 as an engine temperature detecting section for detecting a warmed-up state of the engine is arranged in an appropriate position of a cylinder block near the overheat sensor 34 and outputs a signal proportional to engine cooling wall temperature WT.

An idle speed control (ISC) valve 26 controls, during the idling operation, an air amount for maintaining an idling state. When the air amount needs to be increased, the ISC valve 26 is moved to be narrowed in accordance with a number-of-steps reducing command to increase a space 27 and increase an amount of the intake air. On the other hand, when the air amount is reduced, the ISC valve 26 is moved to be widened in accordance with a number-of-steps increasing command to fill the space 27 with the valve and reduce an amount of the intake air. By controlling the ISC valve 26 in this way, the maintenance of the idling state is realized.

Moreover, the neutral switch as a load detecting section for detecting whether a shift position state of the engine is neutral, or forward or reverse is arranged in a gear box 37 near a shift link mechanism. The neutral switch outputs a signal corresponding to a shift position operated (neutral/forward or reverse), and an engine load is detected in accordance with the output signal.

Signals of the various sensors are sent to the electronic control unit 30 (ECU) as a control section via a signal line. A crank angle sensor 36 functioning as an engine revolution number detecting section for detecting the number of revolutions of the engine is arranged near a flywheel 28 mounted via the crankshaft. The crank angle sensor 36 outputs a crank angle signal and sends the crank angle signal to the ECU 30. The ECU 30 calculates an engine rotation speed NE based on the crank angle signal output from the crank angle sensor 36.

Moreover, in FIG. 2, a started electric fuel pump 41 supplies the fuel from a fuel tank 40 to the injector 23 by a fuel amount calculated by the ECU 30. The fuel pump 41 includes a fuel pressure adjusting mechanism 42. By the fuel pressure adjusting mechanism 42, an unnecessary fuel is returned via a fuel pipe (return) to the fuel tank 40 so that a fuel pressure does not become equal to or higher than a predetermined fuel pressure. The ECU 30 drives the injector 23 based on a fuel supply amount which is computed in advance, and simultaneously calculates the fuel amount necessary for the engine and drives the fuel pump 41 so that the calculated fuel amount can be supplied.

Figure 3:
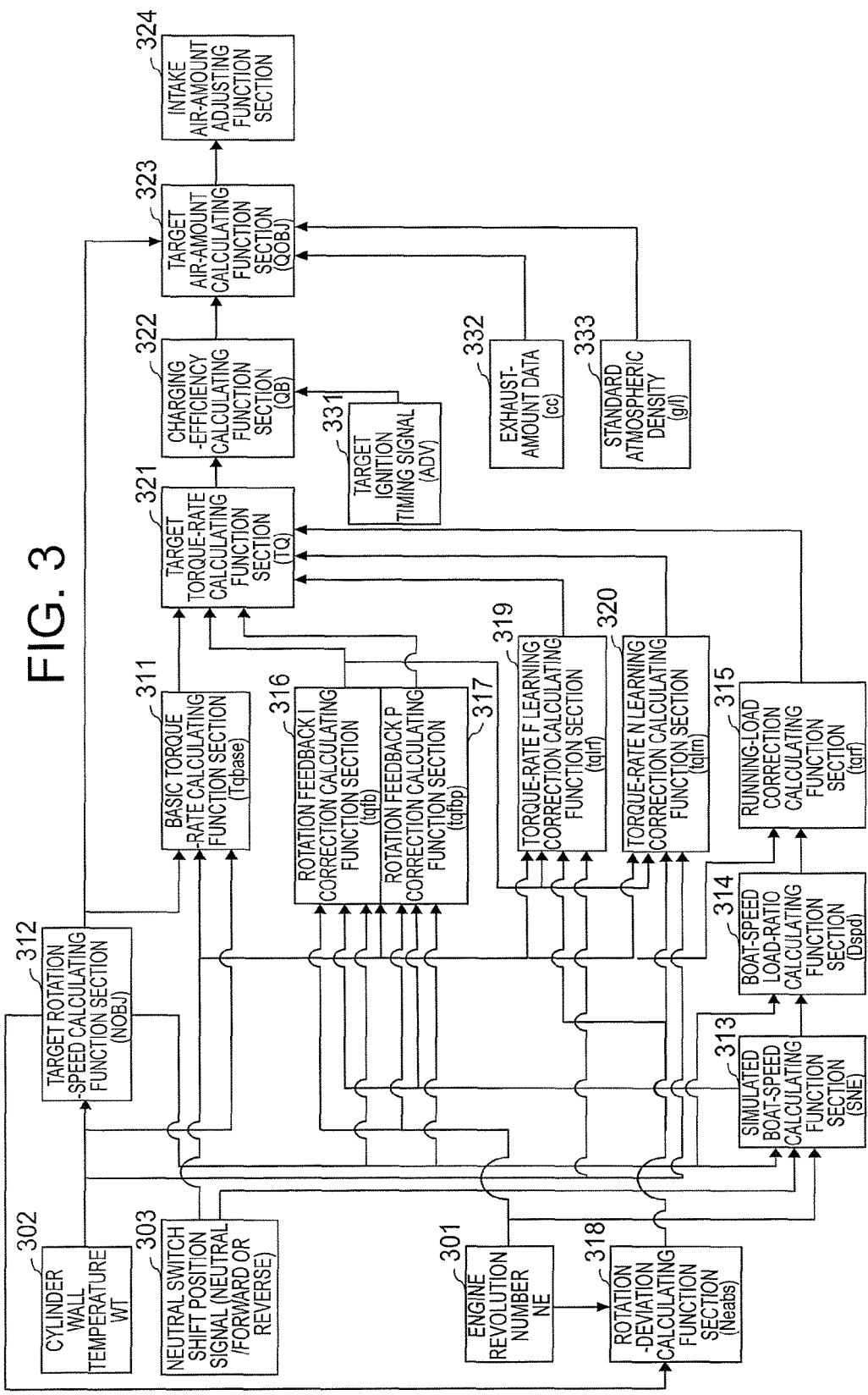
FIG. 3 is an operation function block diagram of an ECU included in the boat engine idling revolution number control device according to the first embodiment of the present invention.

Next, FIG. 3 is an operation function block diagram of the ECU 30 included in the boat engine idling revolution number control device according to the first embodiment of the present invention. Now, a specific operation of the boat engine idling revolution number control device illustrated in FIGS. 1 and 2 referred to above is described in detail referring to the operation function block diagram of the ECU 30 illustrated in FIG. 3.

In FIG. 3, the ECU 30 receives an engine rotation speed NE 301 calculated by the crank angle sensor 36, a cylinder wall temperature WT 302 from the wall temperature sensor 35, and a neutral switch shift position signal 303 from the neutral switch as inputs and provides various calculating functions based on the inputs described above.

Specifically, the ECU 30 includes a basic torque-rate calculating function section 311, a target rotation-speed calculating function section 312, a simulated boat-speed calculating function section 313, a boat-speed load-ratio calculating function section 314, a running-load correction calculating function section 315, a rotation feedback I correction calculating function section 316, a rotation feedback P correction calculating function section 317, a rotation-deviation calculating function section 318, a torque-rate F learning correction calculating function section 319, a torque-rate N learning correction calculating function section 320, a target torque-rate calculating function section 321, a charging-efficiency calculating function section 322, a target air-amount calculating function section 323, and an intake air-amount adjusting function section 324.

The basic torque-rate calculating function section 311 calculates a basic torque rate Tqbase corresponding to a rate of a torque to be generated to a maximum torque of the engine, which is necessary for the engine to steadily operate at the target revolution number while the engine is in an idling state, based on the cylinder wall temperature WT 302, the neutral switch shift position signal 303, and a target rotation speed NOBJ described later.

The target rotation-speed calculating function section 312 calculates the target rotation speed NOBJ from the cylinder wall temperature WT 302.

The simulated boat-speed calculating function section 313 corresponds to a boat running speed detecting section for calculating a simulated boat speed based on the engine rotation speed NE 301, the neutral switch shift position signal 303, and the target rotation speed NOBJ.

The boat-speed load-ratio calculating function section 314 corresponds to a decelerating running determining section for calculating a boat-speed load ratio based on the simulated boat speed and the target rotation speed NOBJ to determine whether the engine is being rotated by the propeller or is rotating by itself based on the running state of the boat.

The running-load correction calculating function section 315 calculates a running-load correction signal tqrf based on the boat-speed load ratio and the neutral switch shift position signal.

The rotation feedback I correction calculating function section 316 and the rotation feedback P correction calculating function section 317 respectively calculate a rotation feedback I correction signal tqfb and a rotation feedback P correction signal tqfbp based on the engine rotation speed NE 301, the neutral switch shift position signal 303, the target rotation speed NOBJ, and the simulated boat speed.

The rotation-deviation calculating function section 318 calculates an absolute value of a deviation between the target rotation speed NOBJ and the engine rotation speed NE as a rotation deviation Neabs.

The torque-rate F learning correction calculating function section 319 and the torque-rate N learning correction calculating function section 320 respectively calculate a torque-rate F learning correction signal tqlrf and a torque-rate N learning correction signal tqlrn based on the cylinder wall temperature WT 302, the neutral switch shift position signal 303, the rotation feedback I correction signal tqfb, and the rotation deviation signal Neabs.

Here, when the neutral switch shift position signal 303 indicates "forward or reverse", the learning is carried out as the amount of variation in engine load (learning amount for F). On the other hand, when the neutral switch shift position signal 303 indicates "neutral (N)", the learning is carried out for no engine load (learning amount for N).

The target torque-rate calculating function section 321 calculates a target torque rate TQ based on the basic torque rate Tqbase, the rotation feedback I correction signal tqfb, the rotation feedback P correction signal tqfbp, the torque-rate F learning correction signal tqlrf, the torque-rate N learning correction signal tqlrn, and the running-load correction signal tqrf.

The charging-efficiency calculating function section 322 calculates a charging efficiency QB based on the target torque rate TQ and a target ignition-timing signal ADV 331.

The target air-amount calculating function section 323 calculates a target air amount QOBJ based on the charging efficiency QB, the target rotation speed NOBJ, preset exhaust-amount data XDISPLACE 332, and a preset standard atmospheric density XDENSITY 333.

The intake air-amount adjusting function section 324, which is provided in a final stage, corresponds to an intake air-amount adjusting section for adjusting an intake air amount to be supplied to the engine by setting an ISC valve opening which allows the target air amount calculated by the target air-amount calculating function section 323 to be supplied to the engine.

Next, a processing series by each of the function sections 311 to 324 included in the ECU 30 is described individually referring to flowcharts.

(Basic Torque-Rate Calculating Function)

Figure 4:
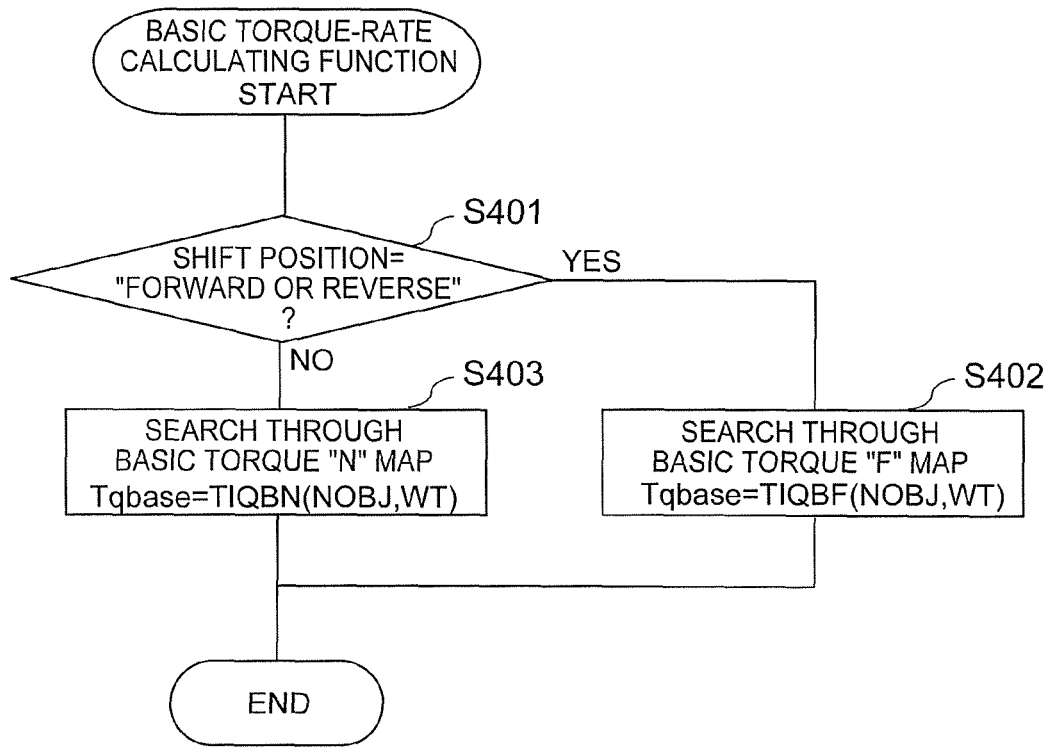
FIG. 4 is a flowchart illustrating a series of processing to be executed by a basic torque-rate calculating function section included in the ECU of the boat engine idling revolution number control device according to the first embodiment of the present invention.

FIG. 4 is a flowchart illustrating a processing series by the basic torque-rate calculating function section 311 included in the ECU 30 of the boat engine idling revolution number control device according to the first embodiment of the present invention. More specifically, FIG. 4 is a flowchart for setting the basic torque rate Tqbase which is necessary to maintain the target rotation speed.

First, in Step S401, the basic torque-rate calculating function section 311 determines whether or not the shift position is forward or reverse. When the basic torque-rate calculating function section 311 determines that the shift position is forward or reverse in Step S401, the processing proceeds to Step S402 where a search is made through a basic torque-rate "F" map TIQBF to set the basic torque rate Tqbase.

On the other hand, when the basic torque-rate calculating function section 311 determines that the shift position is neither forward nor reverse in Step S401, the processing proceeds to Step S403. In this case, the shift position is N (neutral), and hence a search is made through a basic torque-rate "N" map TIQBN to set the basic torque rate Tqbase.

Figure 5:
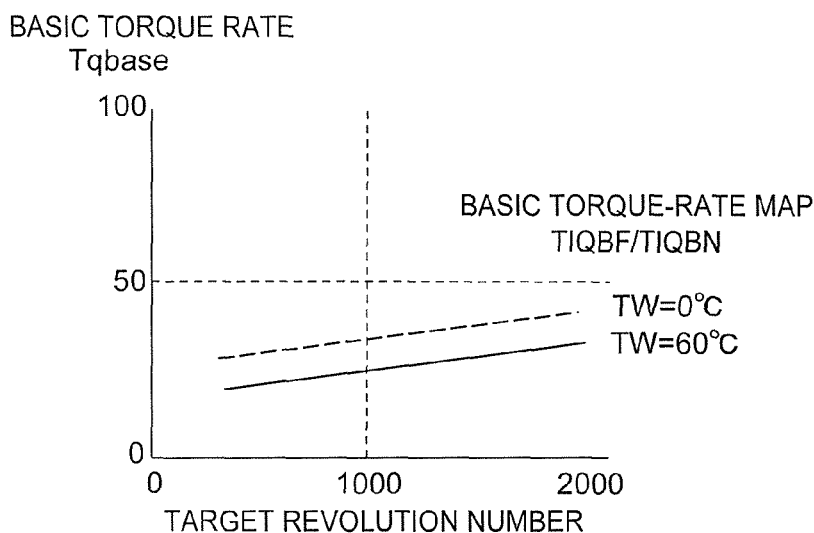
FIG. 5 is a graph showing a characteristic of a basic torque-rate map stored in the basic torque-rate calculating function section included in the ECU of the boat engine idling revolution number control device according to the first embodiment of the present invention.

Each of the basic torque-rate maps TIQBF and TIQBN is configured as a three-dimensional map which defines a correspondence relationship between the target rotation speed NOBJ, the cylinder wall temperature WT, and the basic torque rate. FIG. 5 is a graph showing a characteristic of each of the basic torque-rate maps stored in the basic torque-rate calculating function section 311 included in the ECU 30 of the boat engine idling revolution number control device according to the first embodiment of the present invention. The basic torque-rate "F" map TIQBF or the basic torque-rate "N" map TIQBN is provided as the basic torque-rate map in accordance with each of the shift positions. On each of the maps, the correspondence relationship between the target rotation speed NOBJ (represented as the target revolution number on the horizontal axis of FIG. 5) and the basic torque rate Tqbase in accordance with the cylinder wall temperature WT is defined.

(Target Rotation-Speed Calculating Function)

Figure 6:
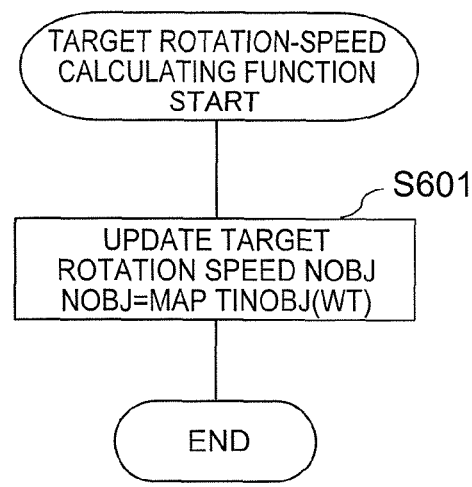
FIG. 6 is a flowchart illustrating a processing series by a target rotation-speed calculating function section included in the ECU of the boat engine idling revolution number control device according to the first embodiment of the present invention.

FIG. 6 is a flowchart illustrating a processing series by the target rotation-speed calculating function section 312 included in the ECU 30 of the boat engine idling revolution number control device according to the first embodiment of the present invention. More specifically, FIG. 6 is a flowchart for setting the target rotation speed NOBJ.

Figure 7:
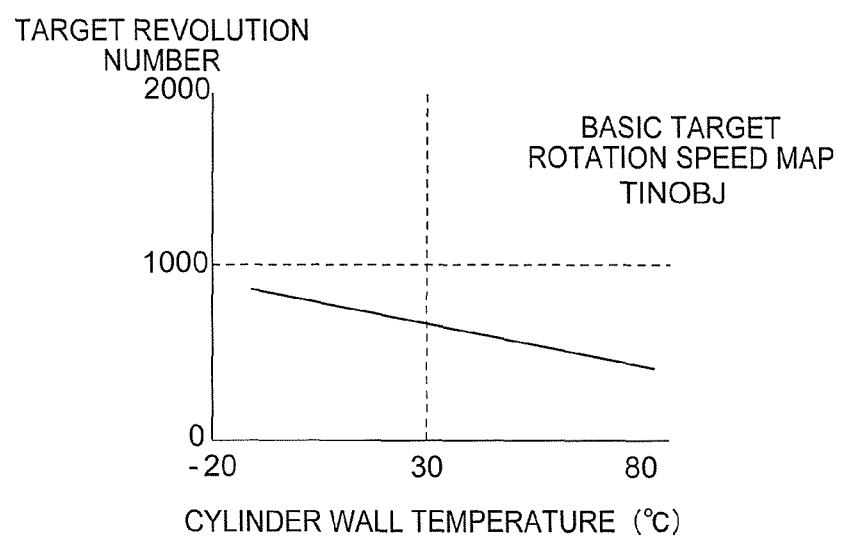
FIG. 7 is a graph showing a characteristic of a basic target rotation-speed map stored in the target rotation-speed calculating function section included in the ECU of the boat engine idling revolution number control device according to the first embodiment of the present invention.

In Step S601, the target rotation-speed calculating function section 312 makes a search through a basic target rotation-speed map TINOBJ to set the target rotation speed NOBJ as a value corresponding to the cylinder wall temperature WT. FIG. 7 is a graph showing a characteristic of the basic target rotation-speed map TINOBJ stored in the target rotation-speed calculating function section 312 included in the ECU 30 of the boat engine idling revolution number control device according to the first embodiment of the present invention. As shown in FIG. 7, the basic target rotation-speed map TINOBJ is configured as a two-dimensional map which defines a correspondence relationship between the cylinder wall temperature WT and the target revolution number.

(Simulated Boat-Speed Calculating Function)

Figure 8:
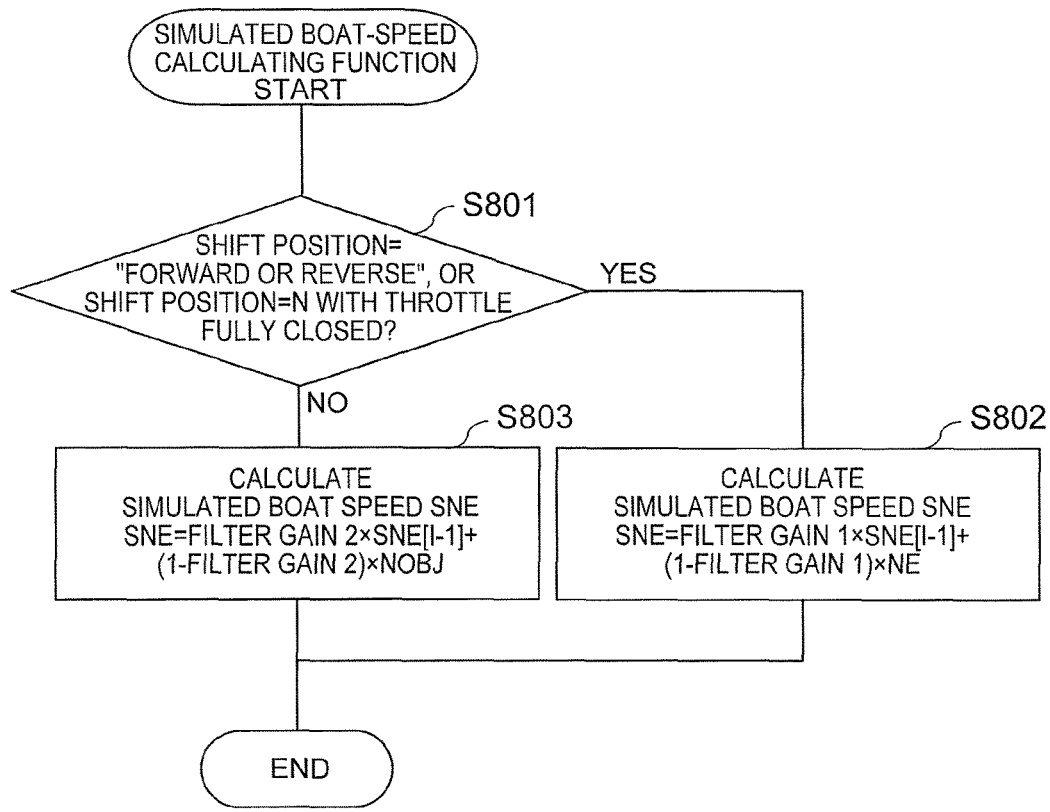
FIG. 8 is a flowchart illustrating a processing series by a simulated boat-speed calculating function section included in the ECU of the boat engine idling revolution number control device according to the first embodiment of the present invention.

FIG. 8 is a flowchart illustrating a processing series by the simulated boat-speed calculating function section 313 included in the ECU 30 of the boat engine idling revolution number control device according to the first embodiment of the present invention. More specifically, FIG. 8 is a flowchart for setting a simulated boat speed SNE.

First, in Step S801, the simulated boat-speed calculating function section 313 determines whether or not the shift position is forward or reverse, or neutral (N) with the throttle fully closed. Then, when the simulated boat-speed calculating function section 313 determines that the shift position is forward or reverse or the shift position is neutral (N) with the throttle fully closed, the processing proceeds to Step S802 where the simulated boat speed SNE is set in accordance with the following expression.

simulated boat speed $SNE$=filter gain 1×previous simulated boat speed $SNE[i-1]$+(1−filter gain 1)×rotation speed $NE$ On the other hand, when the simulated boat-speed calculating function section 313 determines that the shift position is neither forward or reverse nor neutral (N) with the throttle fully closed, the processing proceeds to Step S803 where the simulated boat speed SNE is set in accordance with the following expression.

simulated boat speed $SNE$=filter gain 2×previous simulated boat speed $SNE[i-1]$+(1−filter gain 2)×target rotation speed $NOBJ$ Specifically, the simulated boat-speed calculating function section 313 calculates the simulated boat speed by performing smoothing processing on the engine revolution number or the target revolution number during the idling and switches a smoothing coefficient in accordance with the shift position state. The term "smoothing processing" in this case means processing of smoothly changing a current value of the simulated boat speed from a previous value thereof without an abrupt change.

(Boat-Speed Load-Ratio Calculating Function)

Figure 9:
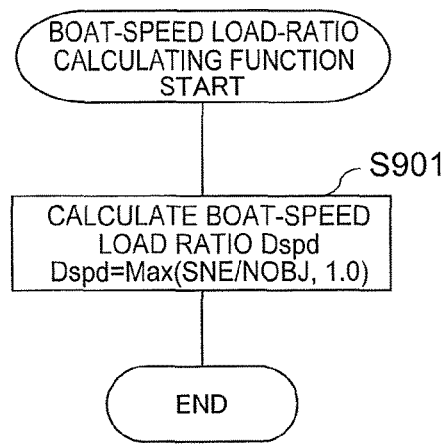
FIG. 9 is a flowchart illustrating a processing series by a boat-speed load-ratio calculating function section included in the ECU of the boat engine idling revolution number control device according to the first embodiment of the present invention.

FIG. 9 is a flowchart illustrating a processing series by the boat-speed load-ratio calculating function section 314 included in the ECU 30 of the boat engine idling revolution number control device according to the first embodiment of the present invention. More specifically, FIG. 9 is a flowchart for setting a boat-speed load ratio Dspd.

In Step S901, the boat-speed load-ratio calculating function section 314 sets the result of: simulated boat speed SNE/target rotation speed NOBJ as the boat-speed load ratio Dspd. In this case, 1.0 is set as a minimum value of the boat-speed load ratio Dspd.

In this step, the boat-speed load-ratio calculating function section 314 determines whether the engine is being rotated by the propeller or is rotating by itself by obtaining the ratio of the simulated boat speed SNE and the target rotation speed NOBJ. However, the boat-speed load-ratio calculating function section 314 can similarly determine whether the engine is being rotated by the propeller or is rotating by itself also by obtaining a deviation between the simulated boat speed SNE and the target rotation speed NOBJ in place of the above-mentioned ratio.

(Running-Load Correction Calculating Function)

Figure 10:
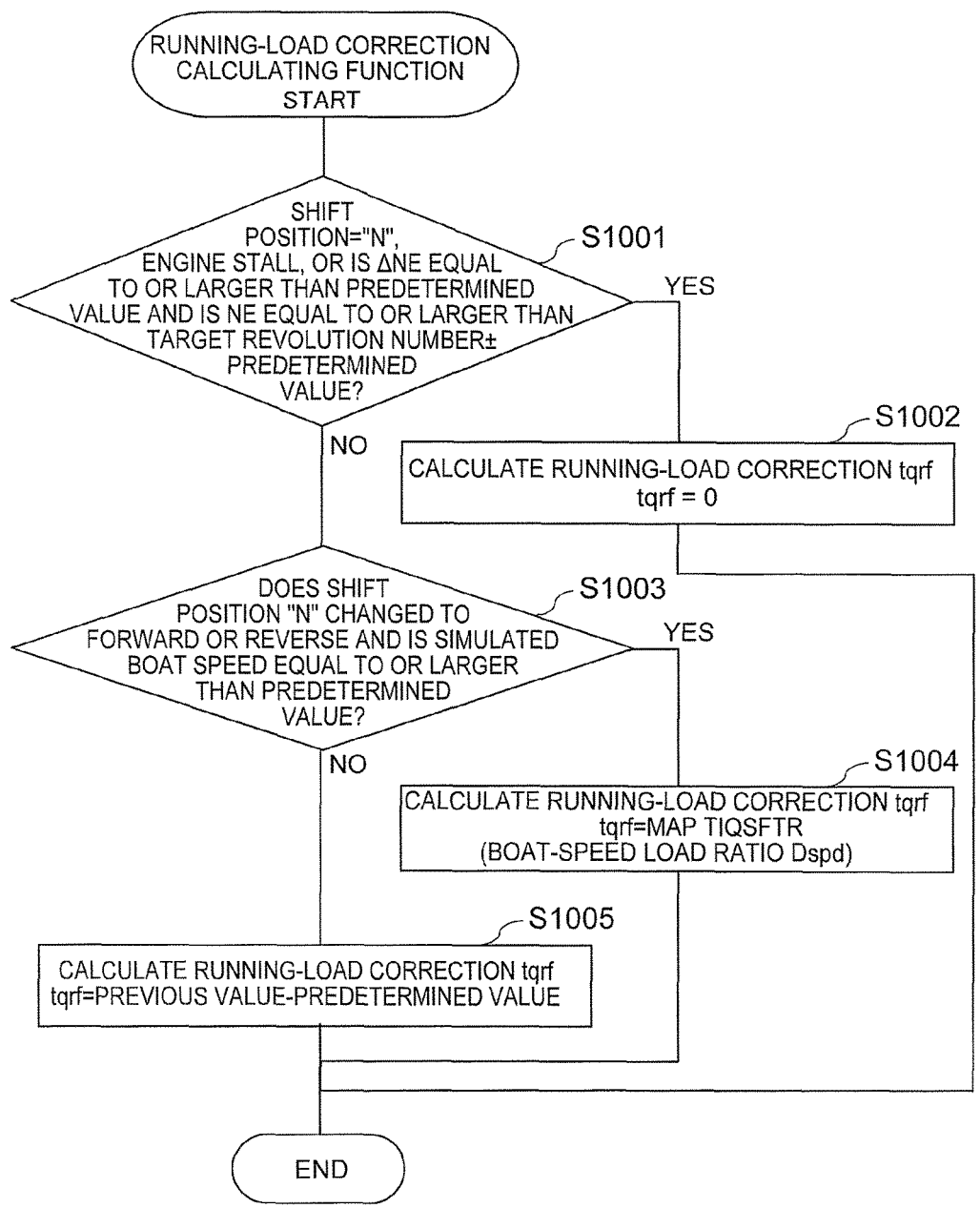
FIG. 10 is a flowchart illustrating a processing series by a running-load correction calculating function section included in the ECU of the boat engine idling revolution number control device according to the first embodiment of the present invention.

FIG. 10 is a flowchart illustrating a processing series by the running-load correction calculating function section 315 included in the ECU 30 of the boat engine idling revolution number control device according to the first embodiment of the present invention. More specifically, FIG. 10 is a flowchart for setting the running-load correction signal tqrf.

First, in Step S1001, the running-load correction calculating function section 315 determines whether or not any one of the following conditions, specifically, the shift position=N, an engine stall, and a fluctuation in rotation on the positive side over a predetermined time period is equal to or larger than a predetermined value and the rotation speed is equal to or higher than: target revolution number±predetermined value, is satisfied.

Then, when the running-load correction calculating function section 315 determines that any one of the above-mentioned conditions is satisfied in Step S1001, the processing proceeds to Step S1002 where the running-load correction signal tqrf is set in accordance with the following expression.

running-load correction signal $tqrf$=0

The reason why the fluctuation in rotation and the revolution number are determined is now described. As the shift position, whether the shift position is neutral (N) or forward or reverse can be only known. Therefore, regardless of whether the shift position is forward (F) or reverse (R), the control is performed with the same value. As a result, when the correction value is used on the F side, there is a possibility that the rotation speed may abruptly increase as an engine behavior. Therefore, when the rotation-speed racing is detected as a result of the determination of the fluctuation in rotation and the revolution number, the correction is immediately set to 0%. Thus, in order to prevent the rotation speed from abruptly increasing, the fluctuation in rotation and the revolution number are determined.

On the other hand, when the running-load correction calculating function section 315 determines that none of the conditions is satisfied in Step S1001, the processing proceeds to Step S1003 where the change of the shift position from neutral (N) to forward or reverse is detected, and whether or not the simulated boat speed is equal to or higher than a predetermined value at the time is determined.

Then, when the running-load correction calculating function section 315 determines that the above-mentioned conditions are satisfied in Step S1003, the processing proceeds to Step S1004 where a search is made through a running-load correction map TIQSFTR to set the running-load correction signal tqrf. In Step S1004, an initial value of the running-load correction is determined.

The running-load correction map TIQSFTR is configured as a two-dimensional map which defines a correspondence relationship between the running-load correction signal tqrf and the boat-speed load ratio Dspd and is stored in the running-load correction calculating function section 315. Here, the running-load correction map TIQSFTR may also be configured based on a deviation between the boat speed and the target boat speed during the idling in place of the ratio of the boat speed and the target boat speed during the idling.

On the other hand, when the running-load correction calculating function section 315 determines that none of the conditions is satisfied in Step S1003, the processing proceeds to Step S1005 where the running-load correction signal tqrf is calculated in accordance with the following expression.

running-load correction signal $tqrf$=previous value−predetermined value

Specifically, the running-load correction calculating function section 315 subtracts a decrease amount (predetermined value) obtained by the ratio of the rotation speed to the target rotation speed from the previous value so as to decrease the running-load correction value for each predetermined time, thereby calculating the running-load correction signal tqrf.

By providing the function illustrated in FIG. 10, even a low-cost boat system, which cannot know whether the shift position is F or R, can appropriately calculate the running-load correction signal by using the neutral switch.

(Rotation Feedback I Correction Calculating Function)

Figure 11:
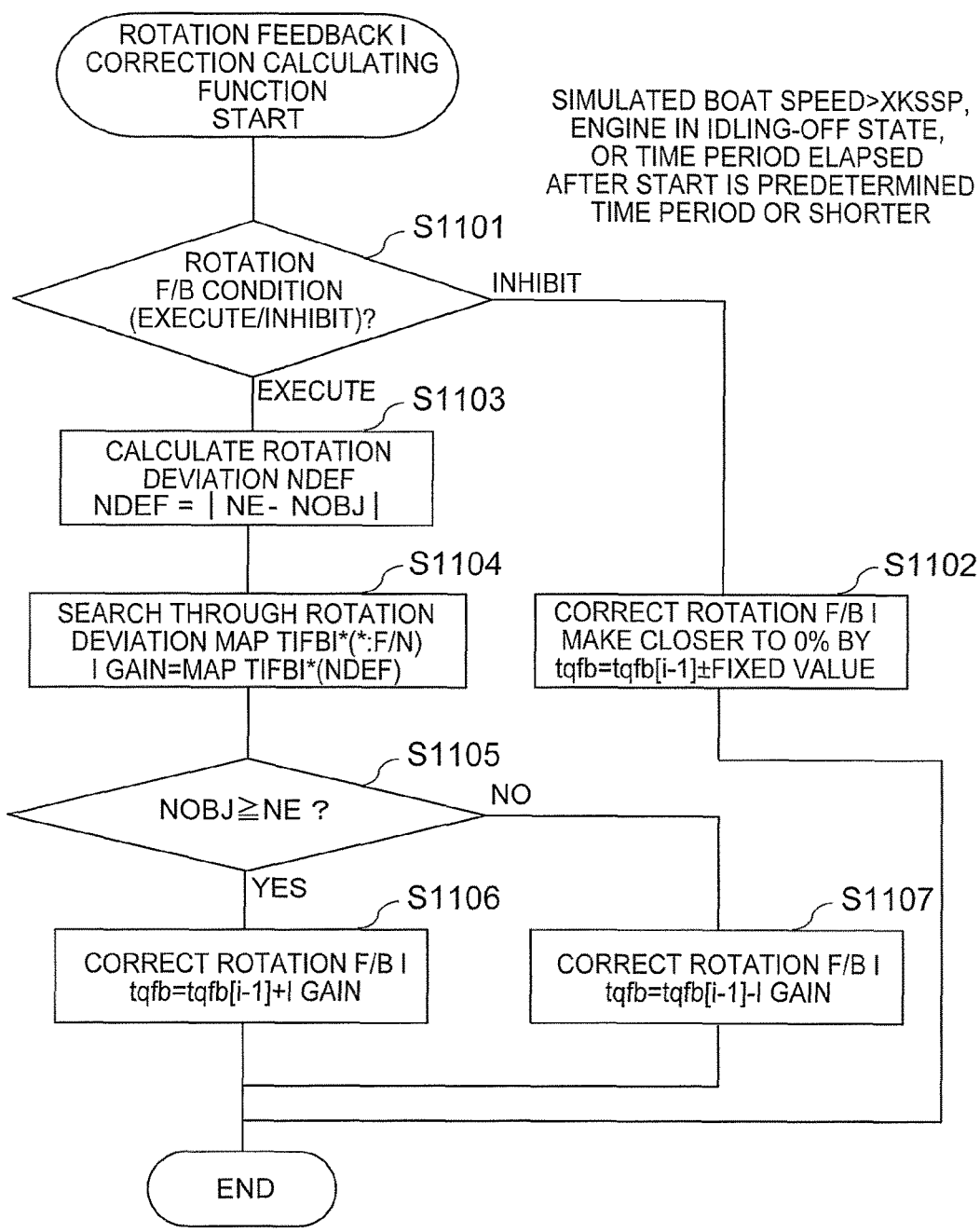
FIG. 11 is a flowchart illustrating a processing series by a rotation feedback I correction calculating function section included in the ECU of the boat engine idling revolution number control device according to the first embodiment of the present invention.

FIG. 11 is a flowchart illustrating a processing series by the rotation feedback I correction calculating function section 316 included in the ECU 30 of the boat engine idling revolution number control device according to the first embodiment of the present invention. More specifically, FIG. 11 is a flowchart for setting the rotation feedback I correction signal tqfb.

First, in Step S1101, the rotation feedback I correction calculating function section 316 verifies a rotation feedback (F/B) condition and determines whether to execute or inhibit the correction of the basic torque rate by the revolution number feedback control.

When the rotation feedback I correction calculating function section 316 determines that any one of the conditions:
the simulated boat speed is decelerating (SNE>XKSSP);
the engine is in an idling-off state; and
the time period elapsed after the start is a predetermined time period or shorter,
is satisfied, the correction of the basic torque rate by the revolution number feedback control is inhibited. Then, the processing proceeds to Step S1102.

Specifically, when determining that the shift position is not neutral and the engine is being rotated by the propeller during the idling operation, the rotation feedback I correction calculating function section 316 inhibits the correction of the basic torque rate by the revolution number feedback control.

Then, in Step S1102, the rotation feedback I correction calculating function section 316 calculates the rotation F/B I correction signal tqfb so as to be closer to 0% from the state of the previous value.

On the other hand, when the rotation feedback I correction calculating function section 316 determines in Step S1101 that the rotation F/B condition is satisfied and the correction of the basic torque rate is to be executed by the revolution number feedback control, the processing proceeds to Step S1103. Then, in Step S1103, the rotation feedback I correction calculating function section 316 calculates a rotation deviation NDEF as an absolute value of a difference between the rotation speed NE and the target rotation speed NOBJ in accordance with the following expression.

$NDEF=|NE-NOBJ|$

Next, in Step S1104, the rotation feedback I correction calculating function section 316 makes a search through a rotation deviation map TIFBI* in which a correspondence relationship between the rotation deviation NDEF and an I gain is preset for each rotation deviation NDEF and each neutral switch shift position signal to calculate the I gain. The rotation deviation map TIFBI* is configured as a two-dimensional map which defines the correspondence relationship between the I gain and the rotation deviation NDEF and is stored in the rotation feedback I correction calculating function section 316.

Then, in Step S1105, the rotation feedback I correction calculating function section 316 compares the target rotation speed NOBJ and the rotation speed NE with each other to determine whether or not a condition: NOBJ≥NE is satisfied.

When the rotation feedback I correction calculating function section 316 determines that the above-mentioned condition is satisfied in Step S1105, the processing proceeds to Step S1106 where the rotation F/B I correction signal tqfb is set in accordance with the following expression.

rotation F/B I correction signal $tqfb=tqfb[i-1]+I$ gain

On the other hand, when the rotation feedback I correction calculating function section 316 determines that the above-mentioned condition is not satisfied in Step S1105, the processing proceeds to Step S1107 where the rotation F/B I correction signal tqfb is set in accordance with the following expression.

rotation F/B I correction signal $tqfb=tqfb[i-1]-I$ gain (Rotation Feedback P Correction Calculating Function)

Figure 12:
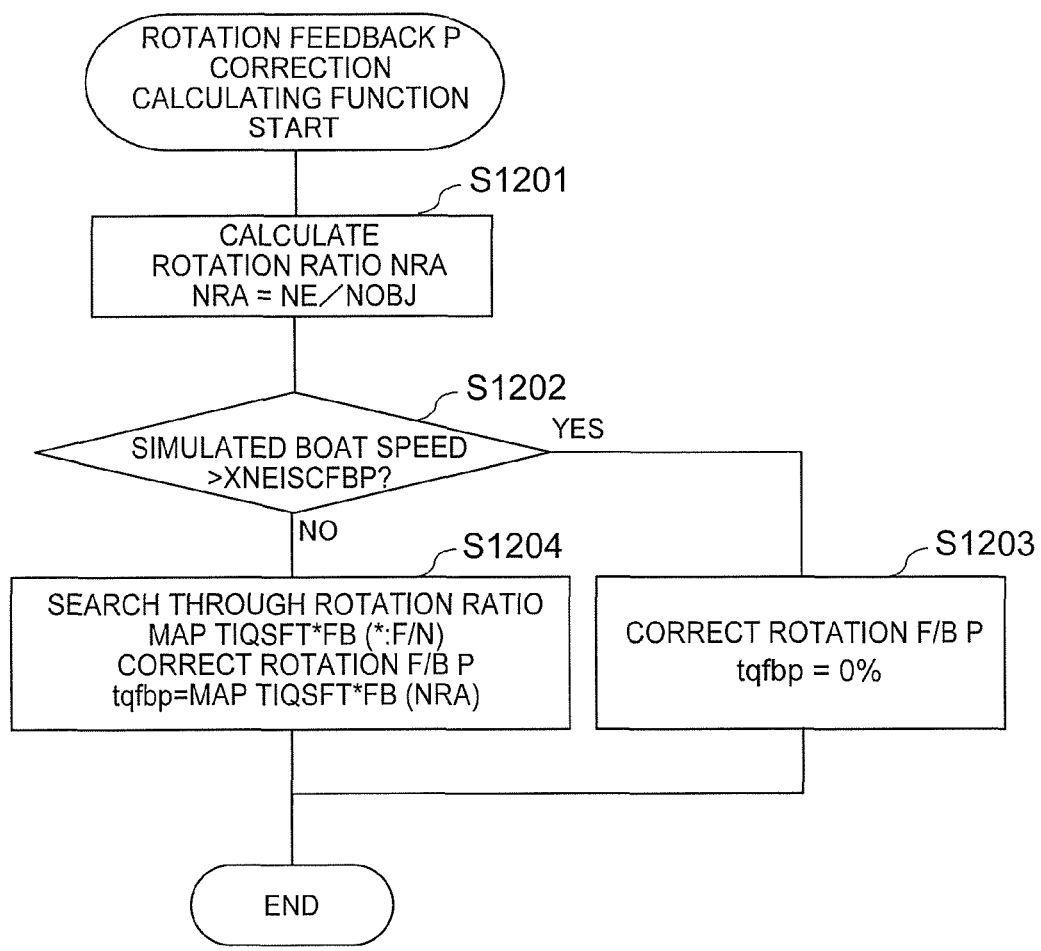
FIG. 12 is a flowchart illustrating a processing series by a rotation feedback P correction calculating function section included in the ECU of the boat engine idling revolution number control device according to the first embodiment of the present invention.

FIG. 12 is a flowchart illustrating a processing series by the rotation feedback P correction calculating function section 317 included in the ECU 30 of the boat engine idling revolution number control device according to the first embodiment of the present invention. More specifically, FIG. 12 is a flowchart for setting the rotation feedback P correction signal tqfbp.

First, in Step S1201, the rotation feedback P correction calculating function section 317 calculates a rotation ratio NRA in accordance with the following expression.

rotation ratio $NRA$=rotation speed $NE$/target rotation speed $NOBJ$

Next, in Step S1202, the rotation feedback P correction calculating function section 317 refers to the simulated boat speed to determine whether or not the following expression is satisfied.

simulated boat speed SNE>XNEISCFBP

When the rotation feedback P correction calculating function section 317 determines that the expression described above is satisfied in Step S1202, the processing proceeds to Step S1203 where the rotation F/B P correction signal tqfbp is set to 0%.

On the other hand, when the rotation feedback P correction calculating function section 317 determines that the expression described above is not satisfied in Step S1202, the processing proceeds to Step S1204. Then, in Step S1204, the rotation feedback P correction calculating function section 317 makes a search through a preset rotation ratio map TIQSFT*FB corresponding to the rotation ratio NRA which is calculated in the previous step S1201 and the neutral switch shift position signal to set the value extracted through the search as the rotation F/B P correction signal tqfbp.

Specifically, the rotation feedback P correction is a correction performed based on the ratio of the target rotation speed and the actual rotation speed during the idling. Therefore, when the state is returned to the idling state during deceleration, the P correction is necessary not to be validated until the boat speed drops to a certain level. Therefore, the rotation feedback P correction calculating function section 317 compares the preset simulated boat speed criterion value XNEISCFBP and the simulated boat speed SNE with each other and sets the P correction to zero to invalidate the P correction when the simulated boat speed SNE is larger than the criterion value XNEISCFBP.

The rotation ratio map TIQSFT*FB is configured as a two-dimensional map which defines a correspondence relationship between the rotation F/B P correction signal tqfbp and the rotation ratio NRA and is stored in the rotation feedback P correction calculating function section 317.

(Rotation-Deviation Calculating Function)

The rotation-deviation calculating function section 318 calculates an absolute value of a difference between the target rotation speed NOBJ and the engine rotation speed NE as a rotation deviation Neabs.

$$Neabs=|NE-NOBJ|$$

The rotation deviation Neabs is used in the torque-rate F learning correction calculating function section 319 and the torque-rate N learning correction calculating function section 320 described later.

(Torque-Rate F Learning Correction Calculating Function)

Figure 13:
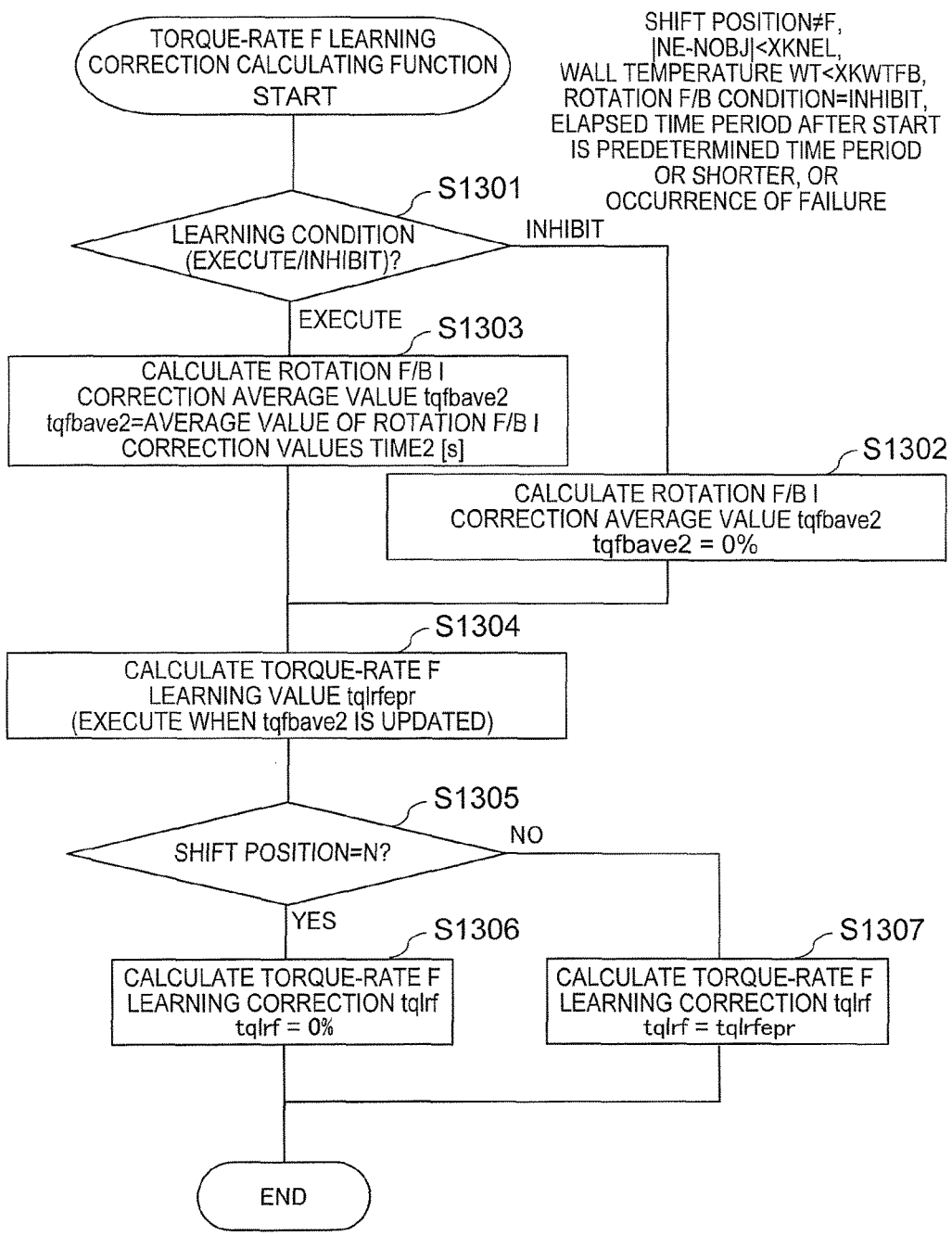
FIG. 13 is a flowchart illustrating a processing series by a torque-rate F learning correction calculating function section included in the ECU of the boat engine idling revolution number control device according to the first embodiment of the present invention.

FIG. 13 is a flowchart illustrating a processing series by the torque-rate F learning correction calculating function section 319 included in the ECU 30 of the boat engine idling revolution number control device according to the first embodiment of the present invention. More specifically, FIG. 13 is a flowchart for setting the torque-rate F learning correction signal tqlrf.

First, in Step S1301, the torque-rate F learning correction calculating function section 319 verifies a learning condition to determine whether to inhibit or execute the learning.

The torque-rate F learning correction calculating function section 319 determines the inhibition of learning when any of the conditions:

shift position≠F;

$|NE-NOBJ|<XKNEL;$ wall temperature WT<XKWTFB;

rotation F/B condition=inhibition;

the time period elapsed after the start is a predetermined time period or shorter; and
occurrence of failure
is satisfied.

Then, when the torque-rate F learning correction calculating function section 319 determines to inhibit the learning in Step S1301, the processing proceeds to Step S1302. Then, the torque-rate F learning correction calculating function section 319 sets a rotation F/B I correction average value tqfbave2 to 0% in Step S1302, and the processing proceeds to Step S1304.

On the other hand, when the torque-rate F learning correction calculating function section 319 determines to execute the learning in Step S1301, the processing proceeds to Step S1303. Then, the torque-rate F learning correction calculating function section 319 sets the rotation F/B I correction average value tqfbave2 in accordance with the following expression in Step S1303, and the processing proceeds to Step S1304.

rotation F/B I correction average value
tqfbave2=average value of predetermined time
period (TIME2) of rotation F/B I correction
value Then, in Step S1304, the torque-rate F learning correction calculating function section 319 calculates a torque-rate F learning value tqlrfepr in accordance with the following expression when the rotation F/B I correction average value tqfbave2 is updated.

torque-rate $F$ learning value $tqlrfepr=tqlrfepr[i-1]+tqfbave2/2$

Next, in Step S1305, the torque-rate F learning correction calculating function section 319 determines whether or not the neutral switch detects the shift position in neutral (N). Then, when the torque-rate F learning correction calculating function section 319 determines that the neutral switch detects the shift position in neutral (N) in Step S1305, the processing proceeds to Step S1306 where the torque-rate F learning correction signal tqlrf is set to 0%.

On the other hand, when the torque-rate F learning correction calculating function section 319 does not determine that the neutral switch detects the shift position in N but determines that the shift position is forward or reverse in Step S1305, the processing proceeds to Step S1307 where the torque-rate F learning correction signal tqlrf is set to tqlrfepr.

(Torque-Rate N Learning Correction Calculating Function)

Figure 14:
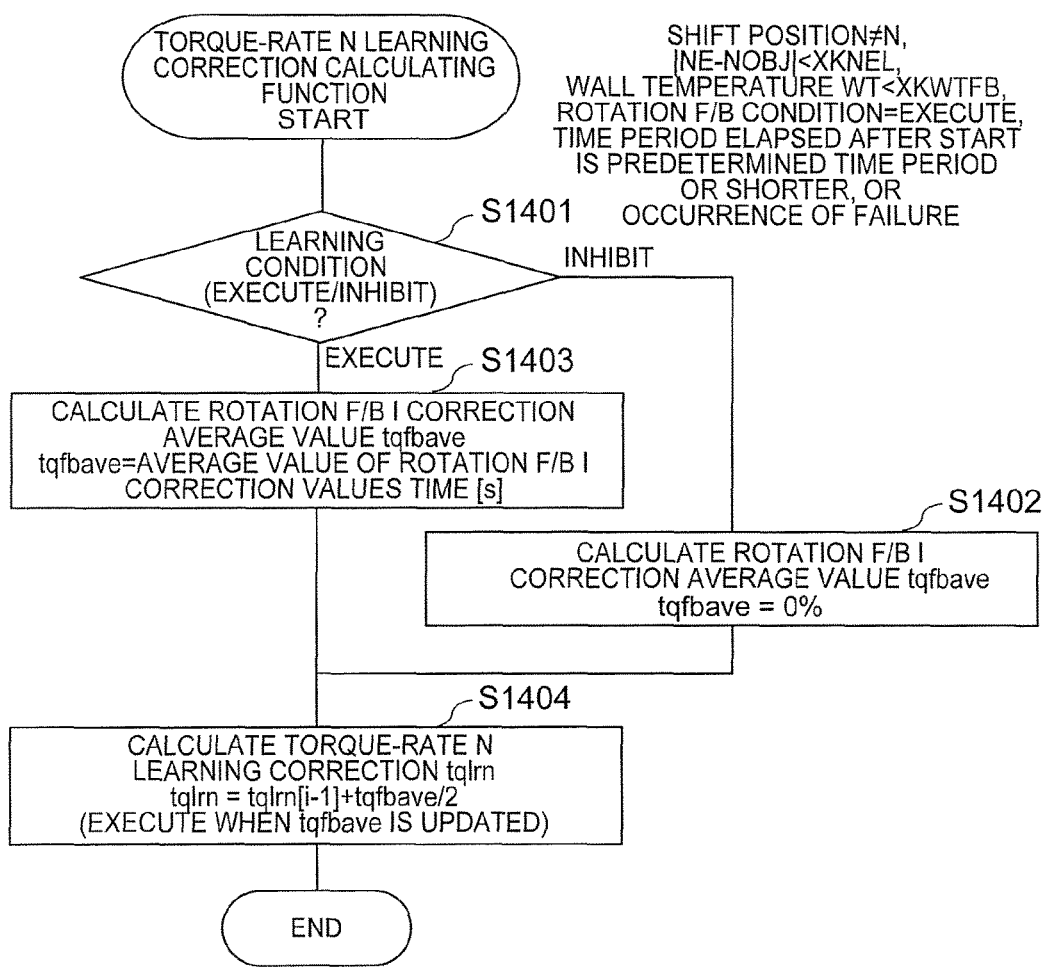
FIG. 14 is a flowchart illustrating a processing series by a torque-rate N learning correction calculating function section included in the ECU of the boat engine idling revolution number control device according to the first embodiment of the present invention.

FIG. 14 is a flowchart illustrating a processing series by the torque-rate N learning correction calculating function section 320 included in the ECU 30 of the boat engine idling revolution number control device according to the first embodiment of the present invention. More specifically, FIG. 14 is a flowchart for setting the torque-rate N learning correction signal tqlrn.

First, in Step S1401, the torque-rate N learning correction calculating function section 320 verifies a learning condition to determine whether to inhibit or execute the learning.

The torque-rate N learning correction calculating function section 320 determines the inhibition of learning when any of the conditions:

shift position≠N;

$|NE-NOBJ|<XKNEL;$ wall temperature WT<XKWTFB;

rotation F/B condition=inhibition;

the time period elapsed after the start is a predetermined time period or shorter; and
occurrence of failure
is satisfied.

Then, when the torque-rate N learning correction calculating function section 320 determines to inhibit the learning in Step S1401, the processing proceeds to Step S1402. Then, the torque-rate N learning correction calculating function section 320 sets a rotation F/BI correction average value tqfbave to 0% in Step S1402, and the processing proceeds to Step S1404.

On the other hand, when the torque-rate N learning correction calculating function section 320 determines to execute the learning in Step S1401, the processing proceeds to Step S1403. Then, the torque-rate N learning correction calculating function section 320 sets a rotation F/B I correction average value tqfbave in accordance with the following expression in Step S1403, and the processing proceeds to Step S1404.

rotation F/B I correction average value tqfbave=average value of predetermined time period (TIME) of rotation F/B I correction value Next, in Step S1404, the torque-rate N learning correction calculating function section 320 calculates the torque-rate N learning correction signal tqlrn in accordance with the following expression when the rotation F/B I correction average value tqfbave is updated.

torque-rate $N$ learning correction signal $tqlrn=tqlrn[i-1]+tqfbave/2$

Specifically, in the torque-rate learning correction, the learning value is calculated independently for each of the shift positions, that is, the shift position of neutral and the shift positions other than neutral based on the average value of the revolution number feedback correction value when the predetermined condition is satisfied during the idling, thereby independently updating the learning value. Then, the learning value when the shift position is neutral is constantly used to calculate the target torque rate regardless of the shift position state. On the other hand, the learning when the shift position is other than neutral is performed after the completion of learning when the shift position is neutral.

(Target Torque-Rate Calculating Function)

Figure 15:
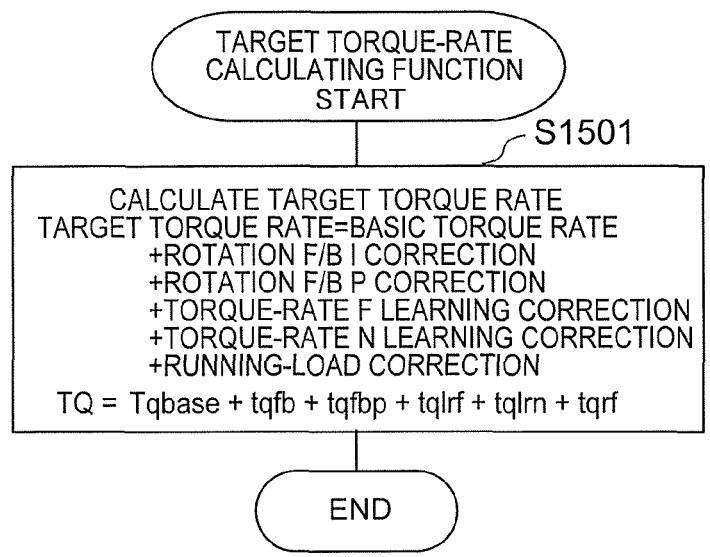
FIG. 15 is a flowchart illustrating a processing series by a target torque-rate calculating function section included in the ECU of the boat engine idling revolution number control device according to the first embodiment of the present invention.

FIG. 15 is a flowchart illustrating a processing series by the target torque-rate calculating function section 321 included in the ECU 30 of the boat engine idling revolution number control device according to the first embodiment of the present invention. More specifically, FIG. 15 is a flowchart for setting the target torque rate TQ.

In Step S1501, the target torque-rate calculating function section 321 adds the basic torque rate Tqbase, the rotation feedback I correction signal tqfb, the rotation feedback P correction signal tqfbp, the torque-rate F learning correction signal tqlrf, the torque-rate N learning correction signal tqlrn, and the running-load correction signal tqrf, which are calculated as described above, to set the target torque rate TQ.

(Charging-Efficiency Calculating Function)

Figure 16:
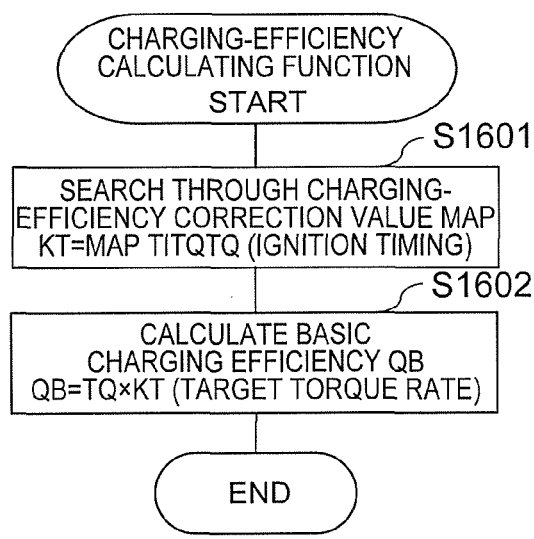
FIG. 16 is a flowchart illustrating a processing series by a charging-efficiency calculating function section included in the ECU of the boat engine idling revolution number control device according to the first embodiment of the present invention.

FIG. 16 is a flowchart illustrating a processing series by the charging-efficiency calculating function section 322 included in the ECU 30 of the boat engine idling revolution number control device according to the first embodiment of the present invention. More specifically, FIG. 16 is a flowchart for setting the basic charging efficiency QB.

First, in Step S1601, the charging-efficiency calculating function section 322 makes a search through a charging-efficiency correction map TITQTQ to set a correction gain KT. The charging-efficiency correction map TITQTQ is configured as a two-dimensional map which defines a correspondence relationship between the correction gain KT and the target ignition timing signal ADV.

Next, in Step S1602, the charging-efficiency calculating function section 322 multiplies the target torque rate TQ calculated as described above and the charging-efficiency correction gain KT to calculate the charging efficiency QB.

Figure 17:
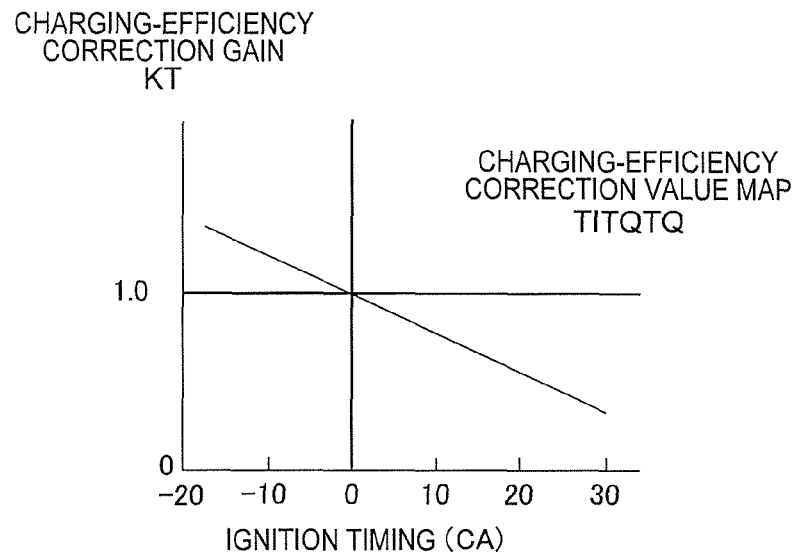
FIG. 17 is a graph showing a characteristic of a charging-efficiency correction map stored in the charging-efficiency calculating function section included in the ECU of the boat engine idling revolution number control device according to the first embodiment of the present invention.

FIG. 17 is a graph showing a characteristic of the charging-efficiency correction map TITQTQ stored in the charging-efficiency calculating function section 322 included in the ECU 30 of the boat engine idling revolution number control device according to the first embodiment of the present invention. Using a target ignition timing (for example, 0 CA) during the idling as a reference (1.0) of the correction gain KT, the charging-efficiency correction gain KT is set as a correction value which allows the charging efficiency to become constant with respect to an ignition-timing change.

In general (with a fixed AF value), the torque increases when the ignition timing advances. Therefore, in order to keep the charging efficiency constant in this case, a value smaller than the reference value is set as the charging-efficiency correction gain KT. On the other hand, when the torque decreases when the ignition timing retards. Therefore, in order to keep the charging efficiency constant in this case, a value larger than the reference value is set as the charging-efficiency correction gain KT.

(Target Air-Amount Calculating Function)

Figure 18:
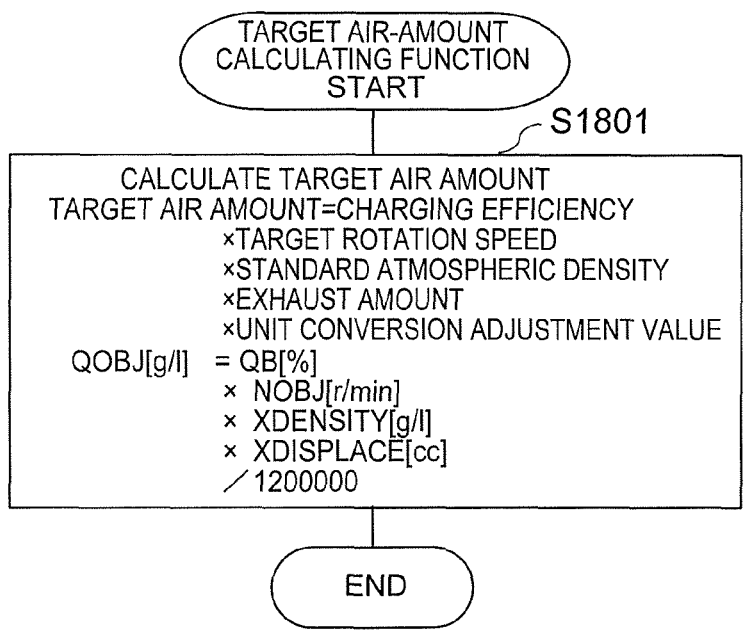
FIG. 18 is a flowchart illustrating a processing series by a target air-amount calculating function section included in the ECU of the boat engine idling revolution number control device according to the first embodiment of the present invention.

FIG. 18 is a flowchart illustrating a processing series by the target air-amount calculating function section 323 included in the ECU 30 of the boat engine idling revolution number control device according to the first embodiment of the present invention. More specifically, FIG. 18 is a flowchart for setting the target air amount QOBJ.

In Step S1801, the target air-amount calculating function section 323 multiplies the charging efficiency QB [%], the target rotation speed NOBJ [r/min], the standard atmospheric density [g/l], the exhaust amount [cc], and a unit conversion adjustment value (1/1,200,000) to calculate the target air amount QOBJ [g/s].

(Intake Air-Amount Adjusting Function)

Figure 19:
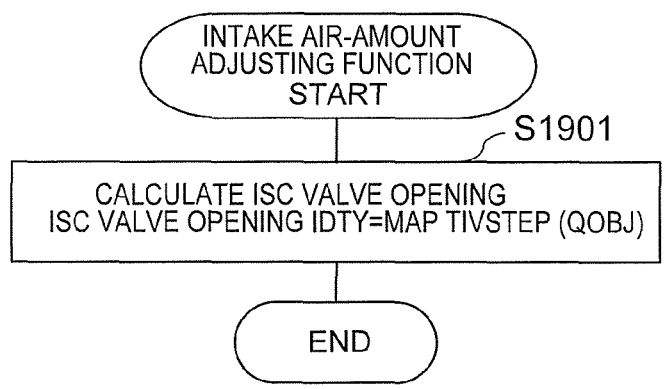
FIG. 19 is a flowchart illustrating a processing series by an intake air-amount adjusting function section included in the ECU of the boat engine idling revolution number control device according to the first embodiment of the present invention.

FIG. 19 is a flowchart illustrating a processing series by the intake air-amount adjusting function section 324 included in the ECU 30 of the boat engine idling revolution number control device according to the first embodiment of the present invention. More specifically, FIG. 19 is a flowchart for setting an ISC valve opening IDTY which is used to adjust the intake air-amount.

In Step S1901, the intake air-amount adjusting function section 324 calculates the ISC valve opening IDTY based on an ISC valve flow-rate characteristic map TIVSTEP and the target air amount QOBJ. The ISC valve flow-rate characteristic map TIVSTEP is configured as a two-dimensional map which defines a correspondence relationship between the ISC valve opening IDTY and the target air amount QOBJ and is stored in the intake air amount adjusting function section 324.

Figure 20:
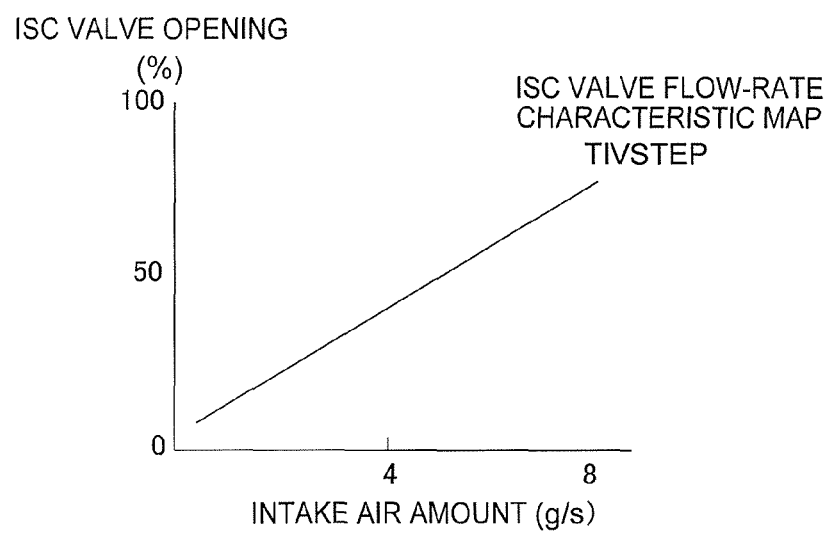
FIG. 20 is a graph showing a characteristic of an ISC valve flow-rate characteristic map stored in the intake air-amount adjusting function section included in the ECU of the boat engine idling revolution number control device according to the first embodiment of the present invention.

FIG. 20 is a graph showing a characteristic of the ISC valve flow-rate characteristic map stored in the intake air-amount adjusting function section 324 included in the ECU 30 of the boat engine idling revolution number control device according to the first embodiment of the present invention. As a map value, an ISC valve opening value for the intake air amount [g/s] corresponding to the target air amount is preset.

The intake air-amount adjusting function section 324 according to the present invention is effective not only with a configuration in which the throttle valve is bypassed as in the case of the ISC valve but also with a configuration using an electronic throttle actuator having an idle control function similarly.

As described above, according to the present invention, when the engine is in the idling state, the conformed data can be set in accordance with the torque rate regardless of the shift position state or a trolling speed. Moreover, for the calculation of the air amount to be supplied, a difference in target rotation speed, ignition timing, and engine exhaust amount is automatically compensated for. Therefore, conformed setting can be easily performed.

Moreover, a control logic can be simplified. As a result, the number of manhours for development can be reduced. Thus, the conformed data can be used for other engines.

Moreover, when the neutral switch alone is used, whether the shift position is neutral, or forward or reverse can be only known. Therefore, whether the boat is moving forward or backward cannot be known. As a result, the control is performed with the same control data regardless of whether the shift position is forward (F) or reverse (R). Thus, when the operation is switched from the forward operation to the backward operation while the boat is running at a certain speed, the correction amount is added so as to prevent the occurrence of an engine stall as the running-load correction. However, whether the shift position is forward (F) or reverse (R) cannot be known. Therefore, under some operation conditions, it is conceivable that the correction amount is undesirably added during the forward operation in the direction opposite to that of the operation to which the correction amount should be added.

If the running-load correction value is added during the forward operation, there is a possibility that drivability degrades due to boat rushing feeling or an abrupt engine-revolution number increase, which is not intended by the boat operator. Therefore, in the present invention, in order to cope with the above-mentioned cases, the running-load correction calculating function which enables the correction amount to be cancelled before the rotation speed abruptly becomes high depending on the behavior of the engine revolution number immediately after the correction.

As a result, even a low-cost system for a boat, which uses the neutral switch alone without including the shift position sensor, can perform the control with the ISC flow-rate value in view of the boat-speed load even when the shift position is abruptly changed from the forward position (from forward through neutral to reverse) for the running-load correction. As a result, the engine stall can be prevented.

Further, by detecting the load based on the engine state and the gear-box state, the boat engine idling revolution number control device with higher accuracy can be provided.

What is claimed is:

1. A boat engine idling revolution number control device, comprising:
    an engine revolution number detecting section for detecting a revolution number of an engine to be mounted in a boat;
    an engine temperature detecting section for detecting a warmed-up state of the engine;
    an idling operation state detecting section for detecting an idling operation state of the engine;
    a neutral switch for detecting whether a shift position state of the engine is neutral, or forward or reverse; and
    a control unit for performing control so as to converge the engine revolution number to a target revolution number when an engine state of the engine is an idling state, the engine state being defined by results of the detections by the engine revolution number detecting section, the engine temperature detecting section, the idling operation state detecting section, and the neutral switch,
    the control unit comprising:
        a simulated boat-speed calculating function section for calculating a simulated boat speed based on the engine revolution number and the shift position state;
        a decelerating running determining section for calculating one of a deviation and a ratio of the simulated boat speed with respect to a target boat speed corresponding to a target revolution number during idling to determine whether the engine is being rotated by a propeller or is rotating by itself depending on a running state of the boat based on a result of the calculation;
        a basic torque-rate calculating function section for calculating a basic torque rate, which is a rate of a torque to be generated to a maximum torque of the engine and is necessary for the engine to steadily operate at the target revolution number while the engine is in the idling state, based on the shift position state detected by the neutral switch, the warmed-up state of the engine detected by the engine temperature detecting section, and the target revolution number;
        a revolution number feedback correction calculating function section for outputting a revolution number feedback correction signal for correcting the basic torque rate so as to eliminate a deviation between the target revolution number and the engine revolution number;
        a torque-rate learning correction calculating function section for calculating a torque-rate learning correction signal based on the revolution number feedback correction signal;
        a running-load correction calculating function section for calculating a running-load correction signal for correcting the basic torque rate in accordance with a result of the determination by the decelerating running determining section and the shift position state detected by the neutral switch;
        a target torque-rate calculating function section for calculating a target torque rate based on the basic torque rate, the revolution number feedback correction signal, the torque-rate learning correction signal, and the running-load correction signal;
        a target air-amount calculating function section for calculating a target air amount necessary to generate the target torque rate; and
        an intake air-amount adjusting function section for adjusting an intake air amount to be supplied to the engine based on the target air amount,
    wherein the running-load correction calculating function section resets the running-load correction signal to zero when detecting, based on a behavior of the engine revolution number after a running-load correction is performed, that the engine revolution number is larger than a threshold value calculated based on the target revolution number and the engine revolution number increases.

2. A boat engine idling revolution number control device according to claim 1, wherein the running-load correction calculating function section prestores a running-load correction map based on one of the deviation and the ratio of the simulated boat speed with respect to the target boat speed during the idling in a memory section, and determines an initial value of the running-load correction based on data of the running-load correction map and starts the running-load correction when the simulated boat speed is equal to or higher than a predetermined value at a time of switching of the shift position state detected by the neutral switch from neutral to forward or reverse.

3. A boat engine idling revolution number control device according to claim 2, wherein the running-load correction calculating function section calculates the running-load correction signal by subtracting a decreasing amount calculated based on one of the deviation and a ratio of the engine revolution number with respect to the target revolution number from a previous value for each predetermined time after determining the initial value of the running-load correction and starting the running correction.

4. A boat engine idling revolution number control device according to claim 1, wherein the simulated boat-speed calculating function section is configured to:
- calculate a current value of the simulated boat speed by performing smoothing processing on a previous value of the simulated boat speed by using the engine revolution number and a filter gain for the engine revolution number when one of a first condition that the shift position state is forward or reverse and a second condition that the shift position state is neutral with a throttle fully closed; and
- calculate the current value of the simulated boat speed by performing the smoothing processing on the previous value of the simulated boat speed by using the target revolution number and a filter gain for the target revolution number when none of the first condition and the second condition is satisfied.

5. A boat engine idling revolution number control device according to claim 2, wherein the simulated boat-speed calculating function section is configured to:
- calculate a current value of the simulated boat speed by performing smoothing processing on a previous value of the simulated boat speed by using the engine revolution number and a filter gain for the engine revolution number when one of a first condition that the shift position state is forward or reverse and a second condition that the shift position state is neutral with a throttle fully closed; and
- calculate the current value of the simulated boat speed by performing the smoothing processing on the previous value of the simulated boat speed by using the target revolution number and a filter gain for the target revolution number when none of the first condition and the second condition is satisfied.

6. A boat engine idling revolution number control device according to claim 3, wherein the simulated boat-speed calculating function section is configured to:
- calculate a current value of the simulated boat speed by performing smoothing processing on a previous value of the simulated boat speed by using the engine revolution number and a filter gain for the engine revolution number when one of a first condition that the shift position state is forward or reverse and a second condition that the shift position state is neutral with a throttle fully closed; and
- calculate the current value of the simulated boat speed by performing the smoothing processing on the previous value of the simulated boat speed by using the target revolution number and a filter gain for the target revolution number when none of the first condition and the second condition is satisfied.

7. A boat engine idling revolution number control method to be executed by an engine idling revolution number control device,
the engine idling revolution number control device comprising:
- an engine revolution number detecting section for detecting a revolution number of an engine to be mounted in a boat;
- an engine temperature detecting section for detecting a warmed-up state of the engine;
- an idling operation state detecting section for detecting an idling operation state of the engine;
- a neutral switch for detecting whether a shift position state of the engine is neutral, or forward or reverse; and
- a control unit for performing control so as to converge the engine revolution number to a target revolution number when an engine state of the engine is an idling state, the engine state being defined by results of the detections by the engine revolution number detecting section, the engine temperature detecting section, the idling operation state detecting section, and the neutral switch, the boat engine idling revolution number control method comprising:
- a simulated boat-speed calculating step of calculating, by the control unit, a simulated boat speed based on the engine revolution number and the shift position state;
- a decelerating running determining step of calculating, by the control unit, one of a deviation and a ratio of the simulated boat speed with respect to a target boat speed corresponding to a target revolution number during idling to determine whether the engine is being rotated by a propeller or is rotating by itself depending on a running state of the boat based on a result of the calculation;
- a basic torque-rate calculating step of calculating, by the control unit, a basic torque rate, which is a rate of a torque to be generated to a maximum torque of the engine and is necessary for the engine to steadily operate at the target revolution number while the engine is in the idling state, based on the shift position state detected by the neutral switch, the warmed-up state of the engine detected by the engine temperature detecting section, and the target revolution number;
- a revolution number feedback correction calculating step of outputting, by the control unit, a revolution number feedback correction signal for correcting the basic torque rate so as to eliminate a deviation between the target revolution number and the engine revolution number;
- a torque-rate learning correction calculating step of calculating, by the control unit, a torque-rate learning correction signal based on the revolution number feedback correction signal;
- a running-load correction calculating step of calculating, by the control unit, a running-load correction signal for correcting the basic torque rate in accordance with a result of the determination by the decelerating running determining section and the shift position state detected by the neutral switch;
- a target torque-rate calculating step of calculating, by the control unit, a target torque rate based on the basic torque rate, the revolution number feedback correction signal, the torque-rate learning correction signal, and the running-load correction signal;
- a target air-amount calculating step of calculating, by the control unit, a target air amount necessary to generate the target torque rate; and
- an intake air-amount adjusting step of adjusting, by the control unit, an intake air amount to be supplied to the engine based on the target air amount, wherein the running-load correction calculating step comprises a correction amount cancel processing step of resetting the running-load correction signal to zero when detecting, based on a behavior of the engine revolution number after a running-load correction is performed, that the engine revolution number is larger than a threshold value calculated based on the target revolution number and the engine revolution number increases.

* * * * *